(12) United States Patent
Chandrasekaran et al.

(10) Patent No.: US 10,769,609 B2
(45) Date of Patent: *Sep. 8, 2020

(54) NETWORK SECURITY BASED ON PROXIMITY WITH IP WHITELISTING

(71) Applicant: Google LLC, Mountain View, CA (US)

(72) Inventors: Sashikanth Chandrasekaran, Belmont, CA (US); Yilei Wang, Sunnyvale, CA (US); Pramod Adiddam, Sunnyvale, CA (US); Zhihong Xu, Santa Clara, CA (US); Varouj Chitilian, Hillsborough, CA (US)

(73) Assignee: Google LLC, Mountain View, CA (US)

( * ) Notice: Subject to any disclaimer, the term of this patent is extended or adjusted under 35 U.S.C. 154(b) by 689 days.

This patent is subject to a terminal disclaimer.

(21) Appl. No.: 15/447,034

(22) Filed: Mar. 1, 2017

(65) Prior Publication Data

US 2017/0255915 A1    Sep. 7, 2017

Related U.S. Application Data

(60) Provisional application No. 62/301,954, filed on Mar. 1, 2016.

(51) Int. Cl.
*G06Q 20/20* (2012.01)
*H04L 29/06* (2006.01)
(Continued)

(52) U.S. Cl.
CPC .......... *G06Q 20/202* (2013.01); *G06Q 20/20* (2013.01); *G06Q 20/3224* (2013.01);
(Continued)

(58) Field of Classification Search
None
See application file for complete search history.

(56) References Cited

U.S. PATENT DOCUMENTS 10,033,712 B2 *   7/2018  Chandrasekaran ... H04L 63/061
2004/0260607 A1 * 12/2004  Robbins .................. G06Q 20/20
                                                705/14.32

(Continued)

FOREIGN PATENT DOCUMENTS

JP    2015-521304 A    7/2015
JP    2016-014997 A    1/2016
(Continued)

OTHER PUBLICATIONS

"Chinese Office Action issued in Chinese Application No. 201780006794.4", dated Jan. 2, 2019, 05 pages of English Translation and 05 pages of Chinese Office Action.
(Continued)

*Primary Examiner* — Steven S Kim
*Assistant Examiner* — Timothy Paul Sax
(74) *Attorney, Agent, or Firm* — Dority & Manning, PA

(57) ABSTRACT

A processing system periodically configures a beacon code and random nonce to transmit to a beacon device at a location. Multiple users enter the location with associated user computing devices and retransmit the beacon code broadcasted by the beacon device to the processing system. A computing device at the location transmits to the processing system a request for account data comprising a hardware identifier and retransmits the beacon code and a random nonce. The processing system verifies the request based on the beacon code and random nonce and transmits, to the computing device at the location, user account identifiers associated with user computing devices that retransmitted the beacon code. Within a threshold period of time, the processing system may verify a subsequent request from the computing device, even without receiving the beacon code and random nonce, if the request comprises the hardware identifier.

20 Claims, 12 Drawing Sheets

(51) Int. Cl.
  *G06Q 20/32* (2012.01)
  *G06Q 20/38* (2012.01)
  *H04W 12/08* (2009.01)
  *H04W 12/00* (2009.01)
(52) U.S. Cl.
  CPC ..... *G06Q 20/3829* (2013.01); *H04L 63/0492* (2013.01); *H04L 63/101* (2013.01); *H04L 63/107* (2013.01); *G06Q 2220/00* (2013.01); *H04L 63/0428* (2013.01); *H04L 63/083* (2013.01); *H04L 63/10* (2013.01); *H04W 12/00503* (2019.01); *H04W 12/08* (2013.01)

(56) References Cited

U.S. PATENT DOCUMENTS

| | | | |
|---|---|---|---|
| 2015/0304341 A1 | 10/2010 | Son et al. | |
| 2012/0291119 A1* | 11/2012 | Boeckner | G06F 21/6218 726/17 |
| 2013/0214909 A1 | 8/2013 | Meijers et al. | |
| 2013/0217332 A1 | 8/2013 | Altman et al. | |
| 2013/0268378 A1 | 10/2013 | Yovin | |
| 2015/0332258 A1* | 11/2015 | Kurabi | G06Q 20/3278 705/71 |
| 2015/0334511 A1* | 11/2015 | Rivera | H04L 63/0272 455/41.2 |
| 2016/0012421 A1 | 1/2016 | Chitilian et al. | |
| 2017/0064554 A1* | 3/2017 | Li | H04W 12/0608 |
| 2017/0279925 A1* | 9/2017 | Zhang | H04L 67/306 |

FOREIGN PATENT DOCUMENTS

| | | |
|---|---|---|
| WO | 2013/152247 A1 | 10/2013 |
| WO | 2017/151820 A1 | 9/2017 |

OTHER PUBLICATIONS

Moon, "Korean Office Action issued in Korean Application No. 10-2018-7020224", dated Sep. 18, 2018, 4 pages of English Translation and 4 pages of Korean Office Action.

Nickitas-Etienne, "International Preliminary Report on Patentability issued in International Application No. PCT/US2017/020279", dated Sep. 13, 2018, 8 pages.

Eozenou, "International Search Report and Written Opinion issued in International Application No. PCT/US2017/020279", dated Apr. 24, 2017, 15 pages.

* cited by examiner

NETWORK SECURITY BASED ON PROXIMITY WITH IP WHITELISTING

CROSS REFERENCE TO RELATED APPLICATION

This application claims priority to U.S. Provisional Patent Application No. 62/301,954 filed Mar. 1, 2016, and entitled "Network Security Based on Proximity with IP Whitelisting," the entire contents of which are hereby fully incorporated herein by reference.

TECHNICAL FIELD

The present disclosure relates to improving security by determining that a requesting computing device is proximately located to a receiving computing device prior to allowing access by the requesting computing device to data of the receiving computing device for a predetermined period of time.

BACKGROUND

In an interaction between two computing devices, a user may enter a service provider system location with a user computing device, such as a mobile phone. A processing system may receive a request from a service computing device at the service provider system location for data associated with user computing devices associated with users currently at the location. A risk exists that illegitimate devices may acquire information relating to the service computing device (such as the IP address, device identifier, or username and password of the service computing device) and obtain access to data of users at the location.

SUMMARY

In accordance with an embodiment, a computer-implemented method to provide secure data access based on computing device proximity verification comprises transmitting, using one or more computing devices and to a beacon computing device, an encrypted random nonce, wherein the beacon computing device broadcasts the encrypted random nonce at a location; receiving, using the one or more computing devices and from a service computing device, a request for first user account information, said request comprising a first user account identifier, a service computing device identifier, a service computing device username and password, and an unencrypted random nonce; in response to receiving the request for first user account information, determining, using the one or more computing devices, that the service computing device is authorized to receive the first user account information based on determining that: the received username and received password correspond to a stored username and stored password associated with the service computing device, and the received unencrypted random nonce corresponds to a random nonce; in response to determining that the service computing device is authorized to receive the first user account information: designating, using the one or more computing devices, the received service computing device identifier as an approved service computing device identifier; and retrieving, using the one or more computing devices, the first user account information; transmitting, using the one or more computing devices and to the service computing device, the first user account information corresponding to the first user account identifier; receiving, using the one or more computing devices and from the service computing device, at a time after transmitting the first user account information, a request for second user account information, said request comprising the service computing device identifier and a second user account identifier; and in response to determining that the received service computing device identifier is designated as an approved service computing device identifier, transmitting, using the one or more computing devices and to the service computing device, the second user account information, the second user account information corresponding to the second user account identifier.

In accordance with another embodiment, a computer program product comprises a non-transitory computer-readable medium having computer-executable program instructions embodied thereon that when executed by one or more computing devices cause the one or more computing devices to provide secure data access based on computing device proximity verification, the computer-executable program instructions comprising: computer-executable program instructions to transmit, to a beacon computing device, an encrypted random nonce, wherein the beacon computing device broadcasts the encrypted random nonce at a location; computer-executable program instructions to receive, from a service computing device, a request for first user account information, the request comprising a first user account identifier, a service computing device identifier, a service computing device username and password, and an unencrypted random nonce; in response to receiving the request for first user account information, computer-executable program instructions to determine that the service computing device is authorized to receive the first user account information based on determining that: the received username and received password correspond to a stored username and stored password associated with the service computing device, and the received unencrypted random nonce corresponds to a random nonce; in response to determining that the service computing device is authorized to receive the first user account information: computer-executable program instructions to designate the received service computing device identifier as an approved service computing device identifier; and computer-executable program instructions to retrieve the first user account information; computer-executable program instructions to transmit, to the service computing device, the first user account information corresponding to the first user account identifier; computer-executable program instructions to receive, from the service computing device, at a time after transmitting the first user account information, a request for second user account information, said request comprising the service computing device identifier and a second user account identifier; and in response to determining that the received service computing device identifier is designated as an approved service computing device identifier, computer-executable program instructions to transmit, to the service computing device, the second user account information.

In accordance with a further embodiment, a system comprises a storage device; and a processor communicatively coupled to the storage device, wherein the processor executes application code instructions that are stored in the storage device to cause the system to: transmit, to a beacon computing device, an encrypted random nonce, wherein the beacon computing device broadcasts the encrypted random nonce at a location; receive, from a service computing device, a request for first user account information, said request comprising a first user account identifier, a service computing device identifier, a service computing device username and password, and an unencrypted random nonce;

in response to receiving the request for first user account information, determine that the service computing device is authorized to receive the first user account information based on determining that: the received username and received password correspond to a stored username and stored password associated with the service computing device, and the received unencrypted random nonce corresponds to a random nonce; in response to determining that the service computing device is authorized to receive the first user account information: designate the received service computing device identifier as an approved service computing device identifier; and retrieve the first user account information; transmit, to the service computing device, the first user account information corresponding to the first user account identifier; receive, from the service computing device, at a time after transmitting the first user account information, a request for second user account information, said request comprising the service computing device identifier and a second user account identifier; and in response to determining that the received service computing device identifier is designated as an approved service computing device identifier, transmit, to the service computing device, the second user account information.

Techniques herein provide computer-implemented methods to verify the legitimacy of computing devices requesting access to data associated with a user conducting a hands-free service request at a particular location. In an example, a first system registers with a processing system and installs a beacon device and a service computing device at a location of the first system. The processing system periodically configures a random beacon code and/or a random nonce at appropriate time intervals for the beacon device and transmits the beacon code and/or random nonce to the beacon device at the appropriate time intervals. A user establishes an account with the processing system and downloads an application onto a user computing device associated with the user. One or more users sign into the application via one or more associated user computing devices and enter the first system location. The user computing devices signed into the application at the first system location receive a beacon device code broadcasted by the beacon device at the first system location and transmit the beacon device code to the processing system. A user at the first system location initiates a service request at the service computing device. The service computing device, in response to an input by a device operator, transmits to the processing system a request for user account data associated with user computing devices currently at the first system location. The point of sale device also retransmits to the processing system the beacon device code and/or the random nonce broadcasted by the beacon device at the first system location. The processing system also receives a hardware identifier associated with either the service computing device or a back-office server responsible for communication between multiple service computing devices at the first system location and the payment processing system. In response to receiving the request for user account data from the service computing device, the processing system logs a current timestamp. The processing system verifies the beacon device code and random nonce and transmits, to the service computing device, user identifiers for user accounts associated with user computing devices at the first system location that retransmitted the beacon device code to the processing system. The processing system also adds the hardware identifier associated with either the service computing device or back-office server to a hardware identifier whitelist and associates the hardware identifier with the logged current timestamp in the hardware identifier whitelist. The service computing device operator determines the identity of the user and selects a user identifier corresponding to the user. The processing system receives an indication of the selection of the user identifier and transmits account information associated with one or more accounts of the user corresponding to the selected user identifier. The processing system receives service request details and an indication of a selection by the service computing device operator of a particular payment account of the user. The processing system communicates an authorization request to an service processing system associated with the selected account to process the service request according to the service request details. The processing system receives an approval of the authorization request and transmits a corresponding authorization to the service computing device.

In certain examples, the service computing device, in response to a subsequent input by a service computing device operator, transmits to the processing system a subsequent request for user account data associated with user computing devices currently at the first system location. However, the service computing device may be unable to retransmit to the processing system the beacon device code and/or the random nonce broadcasted by the beacon device at the first system location. For example, the beacon device suffers a power outage and is unable to broadcast the beacon device code and/or the random nonce at the first system location. The processing system also receives the hardware identifier associated with either the point of sale device or the back-office server responsible for communication between multiple service computing devices at the first system location and the payment processing system. The processing system logs a current timestamp at the time of receipt of the subsequent request for account data.

The processing system, receiving the subsequent request for account data, is unable to verify the beacon device code and/or random nonce or does not receive the beacon device code and/or random nonce and determines whether the received hardware identifier is currently listed on the hardware identifier whitelist. If the received hardware identifier is not currently listed on the hardware identifier whitelist, the processing system denies the subsequent request for account data. If the received hardware identifier is currently listed on the hardware identifier whitelist, the processing system the processing system grants the subsequent request for account data and transmits, to the point of sale device, user identifiers for user accounts associated with user computing devices at the first system location that retransmitted the beacon device code to the processing system.

The service computing device operator determines the identity of the user and selects a user identifier corresponding to the user. The processing system receives an indication of the selection of the user identifier and transmits account information associated with one or more accounts of the user corresponding to the selected user identifier. The processing system receives transaction details and an indication of a selection by the point of sale device operator of a particular payment account of the user. The processing system communicates an authorization request to a service processing system associated with the selected account to process the service request according to the service request details. The processing system receives an approval of the authorization request and transmits a corresponding authorization to the service computing device.

In certain other example aspects described herein, systems and computer program products to verify the legitimacy of computing devices requesting access to data associated with a user conducting a hands-free service request at a first system location are provided.

In certain example embodiments, the service processing system comprises an issuer system, the service request comprises a request to process a transaction, the first system comprises a merchant system, the first system location comprises a merchant store location associated with the merchant system, the service computing device comprises a point of sale computing device, and/or the account of the user comprises a digital wallet account of the user associated with the processing system.

These and other aspects, objects, features, and advantages of the examples will become apparent to those having ordinary skill in the art upon consideration of the following detailed description of illustrated examples.

DETAILED DESCRIPTION OF EXAMPLES

Overview

Figure 1:
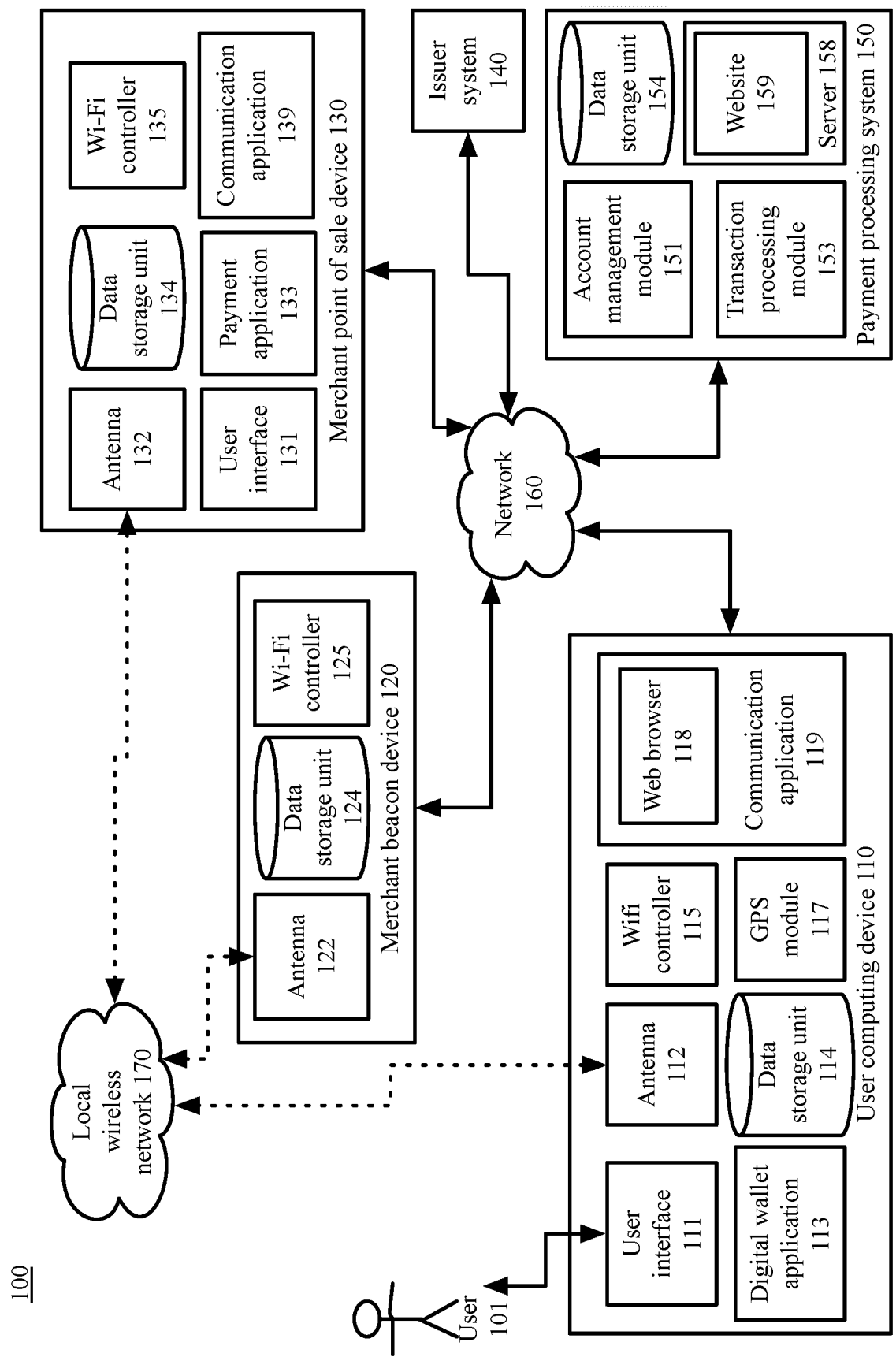
FIG. 1 is a block diagram depicting a system for verifying the legitimacy of point of sale devices requesting access to user financial account data associated with a user conducting a hands-free transaction at a merchant system location, in accordance with certain examples.

The examples described herein provide computer-implemented techniques for verifying the legitimacy of point of sale devices requesting access to user financial account data associated with a user conducting a hands-free transaction at a merchant system location.

In an example, a merchant system registers with a payment processing system and installs a merchant beacon device and a merchant point of sale device at a merchant location. The payment processing system periodically configures a merchant beacon code and/or a random nonce at appropriate time intervals for the merchant beacon device and transmits the beacon code and/or random nonce to the merchant beacon device at the appropriate time intervals. A user establishes a digital wallet account with the payment processing system and downloads a digital wallet application onto a user computing device associated with the user. The user enters payment account information for one or more payment accounts into the digital wallet account via the digital wallet application. One or more users sign into the payment application via one or more associated user computing devices and enter the merchant system location. The user computing devices signed into the payment application at the merchant location receive a merchant beacon device code broadcasted by the merchant beacon device and transmit the code to the payment processing system. A user at the merchant location initiates a transaction at the merchant point of sale device. The merchant point of sale device, in response to an input by an operator of the merchant point of sale device, transmits to the payment processing system a request for user payment account data associated with user computing devices currently at the merchant system location. The merchant point of sale device also retransmits to the payment processing system the beacon device code and/or the random nonce broadcasted by the beacon device. The payment processing system receives, along with the request for user payment account data, a point of sale device hardware identifier or network device hardware identifier associated with a back-office server responsible for communication between multiple point of sale devices at the merchant system location and the payment processing system. The payment processing system logs a current timestamp in response to receiving the request for user account data. The payment processing system verifies the beacon device code and/or random nonce and transmits, to the merchant point of sale device and in response to a successful verification of the beacon device code and/or random nonce, user identifiers for user digital wallet accounts associated with user computing devices at the merchant system location that retransmitted the beacon device code to the payment processing system. Also, in response to a successful verification of the random nonce and/or beacon device code, the payment processing system stores the received network hardware identifier or merchant point of sale device identifier in a hardware identifier whitelist accessible by the payment processing system and associates the logged current time stamp with the received hardware identifier in the hardware identifier whitelist. The merchant point of sale device operator determines the identity of the user and selects a user identifier corresponding to the user. The payment processing system receives an indication of the selection of the user identifier and transmits payment account information associated with one or more payment accounts of the user corresponding to the selected user identifier. The payment processing system receives an indication of a selection by the point of sale device operator of a particular payment account of the user and transaction details. The payment processing system communicates a transaction authorization request to an issuer system associated with the selected payment account to process the transaction according to the transaction details. The payment processing system receives an approval of the transaction authorization request and transmits a receipt to the merchant point of sale device.

In certain examples, the payment processing system may validate the merchant point of sale device or other device using a hardware identifier whitelist in circumstances in which the merchant point of sale device cannot transmit the beacon device code and/or random nonce and/or the payment processing system cannot receive and/or validate the beacon device code and/or random nonce. The payment processing system maintains a hardware identifier whitelist comprising a listing of hardware identifiers of merchant point of sale devices and/or back-office servers involved in requests for user account data where the payment processing system has successfully validated a received random nonce and/or merchant beacon device identifier received in the request. When a device hardware identifier is added to the whitelist, a current timestamp logged at the time that the request for user account data from the device associated with that particular hardware identifier is logged in the whitelist as being associated with the hardware identifier. In an example, the payment processing system deletes a particular listing in the hardware identifier whitelist when a threshold period of time after the time associated with the current timestamp associated with the listing passes. In another example, the payment processing system maintains the particular listing in the hardware identifier whitelist for a predetermined period of time after the time associated with the timestamp associated with the listing and deletes the listing after the predetermined period of time expires.

In an example, the payment processing system receives one or more subsequent requests from the merchant point of sale device for user payment account data associated with user computing devices currently at the merchant system location. In a subsequent request for user account data, the merchant point of sale device may be unable to receive and/or transmit a merchant beacon device identifier and/or random nonce associated with the merchant beacon device. In an example of a subsequent request for user account data, a user at the merchant location initiates a transaction at the merchant point of sale device. The merchant point of sale device, in response to an input by an operator of the merchant point of sale device, transmits to the payment processing system a subsequent request for user payment account data associated with user computing devices currently at the merchant system location. The merchant point of sale device is unable to retransmit to the payment processing system the beacon device code and/or the random nonce broadcasted by the beacon device. The payment processing system receives, along with the request for user payment account data, a point of sale device hardware identifier or network device hardware identifier associated with a back-office server responsible for communication between multiple point of sale devices at the merchant system location and the payment processing system. The payment processing system logs a current timestamp in response to receiving the request for user account data from the merchant point of sale device. The payment processing system determines that the request for user account data does not comprise a beacon device code and/or random nonce. In another example, the payment processing system is unable to verify the beacon device code and/or random nonce.

The payment processing system determines whether the received hardware identifier is currently listed on the hardware identifier whitelist. If the received hardware identifier is not currently listed on the hardware identifier whitelist, the processing system denies the subsequent request for account data. If the received hardware identifier is currently listed on the hardware identifier whitelist, the processing system grants the subsequent request for account data and transmits, to the point of sale device, user identifiers for user accounts associated with user computing devices at the first system location that retransmitted the beacon device code to the processing system.

The merchant point of sale device operator determines the identity of the user and selects a user identifier corresponding to the user. The payment processing system receives an indication of the selection of the user identifier and transmits payment account information associated with one or more payment accounts of the user corresponding to the selected user identifier. The payment processing system receives an indication of a selection by the point of sale device operator of a particular payment account of the user and transaction details. The payment processing system communicates a transaction authorization request to an issuer system associated with the selected payment account to process the transaction according to the transaction details. The payment processing system receives an approval of the transaction authorization request and transmits a receipt to the merchant point of sale device.

In an example, a merchant system registers with a payment processing system. A merchant system operator installs a payment application on a merchant point of sale device. In another example, the merchant system operator installs the payment application on a plurality of merchant point of sale devices at a merchant system location. The merchant system operator installs one or more merchant beacon devices at the merchant system location to correspond to one or more installed merchant point of sale devices at the merchant location. The payment processing system, for each merchant point of sale device installed at the merchant system location and a merchant beacon device identifier associated with a merchant beacon device corresponding to the point of sale device. In another example, the payment processing system may further receive, for each merchant point of sale device installed at the merchant system location, a merchant point of sale device identifier. The payment processing system may associate each received merchant point of sale device identifier with a corresponding received merchant beacon device identifier. In another example, the payment processing system associates the received merchant beacon device identifier with a merchant system location identifier. For example, the payment processing system comprises a database wherein the payment processing system stores merchant beacon identifiers and associated merchant point of sale device identifiers and/or associated merchant system location identifiers. In this example, the merchant system may comprise multiple merchant system locations. For example, the merchant system comprises a grocery store chain having multiple physical store locations, each physical store location having a unique merchant system location identifier and one or more merchant point of sale devices at the merchant system location associated with the merchant system location identifier associated with the particular physical store location.

In an example, a particular merchant beacon device corresponding to a particular merchant point of sale periodically receives a beacon identifier code from a payment processing system. For example, each of the one or more merchant point of sale devices at the merchant location is associated with a corresponding merchant beacon device installed at the merchant location. In an example, the payment processing system may determine a new merchant beacon device code every five minutes to transmit to the particular merchant beacon device. An example merchant beacon device code is randomly generated and comprises a string of alphanumeric and/or symbolic characters. The particular merchant beacon device broadcasts the merchant beacon device code via wireless communication at the merchant system location. In an example, each time the particular merchant beacon device receives a new merchant beacon device code, the particular merchant beacon device stops broadcasting the previous merchant beacon device code and broadcasts the new merchant beacon device code. The merchant beacon device may also periodically receive a random nonce from the payment processing system. For example, the payment processing system may generate a new random nonce every thirty seconds to transmit to the merchant beacon device. In certain examples, the payment processing system may periodically generate an encrypted nonce to transmit to the merchant beacon device using an encryption key shared between the payment processing system and the point of sale device associated with the merchant beacon device. In an example, the encryption key is installed on the merchant point of sale device with the payment application or is otherwise preinstalled on the merchant point of sale device. In an example, the payment processing system associates, for each merchant beacon device, the current merchant beacon device code and the current random nonce with the device identifier associated with the merchant beacon device, the device identifier associated with the particular merchant point of sale device, and/or the merchant system location identifier. The merchant beacon device periodically broadcasts the merchant beacon device code and random nonce via wireless communication at the merchant point of sale device. For example, the merchant beacon device periodically broadcasts the merchant beacon device code and random nonce at the merchant location via a Bluetooth network, Wi-Fi network, or other appropriate network connection.

In an example, the merchant beacon device broadcasts the merchant beacon device code and the random nonce via a common wireless network protocol, for example, a Wi-Fi network. In another example, the merchant beacon device broadcasts the merchant beacon device code via a first wireless network protocol and the random nonce via a second wireless network protocol. For example, the merchant beacon device broadcasts the merchant beacon device code via a Wi-Fi network and broadcasts the random nonce via a Bluetooth network. In an example, the merchant beacon device broadcasts the merchant beacon device code as part of a wireless access point identifier associated with the merchant beacon device. In this example, it is not necessary for a user computing device or a merchant point of sale device to establish a network connection with the merchant beacon device to receive the merchant beacon device code and the merchant point of sale device and/or user computing device may scan for a wireless access point identifier broadcasted by the merchant beacon device that comprises the merchant beacon device code.

In an example, the user registers with the payment processing system. For example, the user accesses a payment processing system website via a user computing device associated with the user. The user registers with the payment processing system and downloads a digital wallet application onto the user computing device. In an example, the user adds payment account information to the digital wallet account associated with one or more payment accounts of the user via the digital wallet application. For example, the digital wallet application communicates data to and receives data from the payment processing system via a network and the payment processing system manages the user's digital wallet account.

The user signs in to the digital wallet application on the user computing device and enters the merchant system location. The user computing device may periodically log location data, for example, every five minutes, describing the current location of the user computing device if the user is signed in to the payment application and has enabled location services. The user carries the user computing device within a threshold distance of a merchant beacon device at the merchant system location. The user computing device periodically receives a merchant beacon device code and broadcast by the merchant beacon device and transmits the received merchant beacon device code, a user account identifier, and current logged location data to the payment processing system. For example, the user computing device establishes a local wireless network connection, such as a Bluetooth network connection, Wi-Fi network connection, or other wireless network connection between the user computing device and the merchant beacon device. In another example, the user computing device does not need to establish a network connection with the merchant beacon device, but may scan for wireless network access point identifiers and determine the merchant beacon device code from a wireless network access point identifier. In an example, the merchant beacon device receives a subsequent merchant beacon device code every five minutes from the payment processing system. The payment processing system receives the merchant beacon device code, the user account identifier, and the current logged location data from the user computing device via a network. The payment processing system maintains a database that associates received user account identifiers associated with user computing devices with associated received merchant beacon device codes, and received current logged location data. For example, for each transmission of data received from a user computing device associated with a particular user account identifier, the payment processing system associates the received merchant beacon device code and received current logged location data with the particular user account identifier in the database.

The user approaches a merchant point of sale device. The merchant point of sale device operator totals items of the user for purchase. The merchant point of sale device operator asks the user to select a payment option. The user directs the merchant point of sale device operator to initiate a transaction via the digital wallet application. For example, as previously discussed, the digital wallet application is installed on the user computing device. The merchant point of sale device operator selects an option on the merchant point of sale device to initiate a transaction using the digital wallet application. The merchant point of sale device receives the merchant beacon device code and/or random nonce broadcasted by the merchant beacon device over a network connection between the merchant beacon device and merchant point of sale device at the merchant location. In an example, the merchant point of sale device receives an encrypted nonce and decrypts the encrypted nonce using an encryption key, shared between the payment processing system and the merchant point of sale device, to generate a decrypted random nonce. The merchant point of sale device transmits a request for payment account information to the payment processing system along with one or more authentication credentials comprising a merchant system point of sale device identifier, a username and password associated with the merchant point of sale device, an IP address associated with the merchant point of sale device, the merchant beacon device code and/or a decrypted random nonce. The merchant system point of sale device may also transmit other appropriate authentication credentials in addition to or instead of the one or more of authentication credentials described herein to the payment processing system. In another example, the merchant point of sale device receives an unencrypted nonce from the merchant beacon device and transmits the unencrypted nonce to the payment processing system.

The payment processing system validates the merchant point of sale device requesting user payment account information. For example, the payment processing system verifies that a point of sale device identifier and associated password are correct. In another example, the payment processing system verifies that the merchant beacon device code received from the point of sale device corresponds to the merchant beacon device code associated with the merchant point of sale device identifier and/or merchant system location identifier in the database of the payment processing system. In yet another example, the payment processing system verifies that the unencrypted random nonce received from the point of sale device corresponds to the unencrypted random nonce associated with the merchant point of sale device identifier and/or merchant system location identifier in the database of the payment processing system. In an example, if the payment processing system determines that one or more of the received merchant point of sale device identifier, username and password, merchant beacon device code, and/or unencrypted random nonce are invalid, the payment processing system denies the merchant point of sale device request for user payment account information. In another example, if the payment processing system determines that the requesting merchant point of sale device is legitimate based on one or more of the received merchant point of sale device identifier, username and password, IP address, merchant beacon device code, and/or unencrypted random nonce, the payment processing system identifies user account identifiers associated with user computing devices from which the matching beacon device code has been received and having location data within a threshold proximity to an expected location of the merchant beacon device. For example, the payment processing system identifies user account identifiers for all users having digital wallet accounts with the payment processing system who are both signed in to the digital wallet account and are present at the merchant system location within a radio signal proximity to the merchant beacon device. The payment processing system transmits the identified user account identifiers to the merchant point of sale device over the network. The merchant point of sale device receives the user account identifiers from the payment processing system over the network. In another example, the payment processing system does not transmit all the identified account identifiers and only transmits one or a subset of the identified user account identifiers in response to receiving a challenge response from the merchant point of sale device.

The merchant point of sale device operator identifies the user via a challenge and response. The user provides a challenge response and the merchant point of sale operator inputs the response into the merchant point of sale device. The merchant point of sale device displays potential user account identifiers from the user account identifiers received from the payment processing system based on the challenge response. For example, the merchant point of sale device transmits the response to the payment processing system and the payment processing system accesses a database comprising a list or table that associates challenges with corresponding responses and user account identifiers. For example, the challenge response may comprise a user's initials that are associated with a particular user digital wallet account. In this example, the user configures a challenge response with the digital wallet account at the time the user registers the digital wallet account with the payment processing system. In this example, the payment processing system identifies one or more particular user account identifiers from the identified user account identifiers by correlating the challenge and the response to identify one or more user account identifiers in the database. In this example, the payment processing system transmits the one or more particular identified users identified based on the challenge response to the merchant point of sale device. In this example, the merchant point of sale device displays the one or more particular identified user account identifiers to the merchant point of sale device operator via a user interface of the merchant point of sale device.

The merchant point of sale device operator selects a user account identifier from the displayed one or more user account identifiers. In an example, the merchant point of sale device operator may compare a visual image or name of the user displayed on the user computing device to the visual appearance of the current customer at the merchant point of sale device and/or documentation presented by the user to the merchant point of sale operator for added security. In an example, the merchant point of sale device transmits an indication of the selection of the user account identifier selected by the merchant point of sale operator to the payment processing system via the network.

The point of sale device displays one or more payment accounts of the identified user. For example, after receiving the selected user account identifier from the merchant point of sale device or otherwise identifying the user account identifier, the payment processing system transmits information associated with one or more accounts of the identified user account identifier to the merchant point of sale device for display via the user interface of the merchant point of sale device. The merchant point of sale device operator, at the direction of the user, selects a particular displayed user payment account for the transaction and selects, via the merchant point of sale device, an option to confirm the transaction with permission of the user. In response to the merchant point of sale device operator selecting an option via the user interface to confirm the transaction, the merchant point of sale device transmits transaction details to the payment processing system along with an indication of the selection of the particular payment account. For example, transaction details may comprise a total amount of the transaction, a selected user account for use in the transaction, an account of the merchant system for use in the transaction, and other useful or relevant information. The payment processing system may extract payment account information associated with the selected user payment account, for example, one or more of a payment account number, a payment account name, an expiration date associated with the selected payment account, an address associated with the selected payment account, and/or other appropriate information associated with the selected payment account for use in the transaction. The payment processing system transmits a transaction authorization request to an issuer system along with the payment account information. For example, the issuer system is associated with the user payment account selected for use in the transaction. The issuer system approves the transaction authorization request and transmits a transaction authorization approval to the payment processing system. The payment processing system transmits a transaction receipt to the merchant point of sale device. An example transaction receipt may comprise one or more transaction details, a summary of the method of payment used in the transaction, a subtotal before taxes, and amount of tax paid, and/or a total amount paid by the user for the transaction. In another example, the issuer system denies the transaction authorization request and transmits a notice of a declined transaction authorization request to the payment processing system. In this example, the payment processing system transmits a receipt to the merchant point of sale device comprising a notice that the transaction was declined by the issuer system.

In certain examples, the payment processing system may validate a device other than a point of sale device requesting user information. For example, the methods described herein may be used to validate any device in proximity to a beacon device that broadcasts a beacon device code or random nonce configured by the payment processing system. For example, the payment processing system may validate a second user computing device transmitting a request for a user 101 account information. In certain examples, instead of user 101 account information associated with user payment accounts, the payment processing system may provide other appropriate information to a point of sale device or other appropriate device that is requesting user 101 information.

In certain examples, the payment processing system 150 may validate the merchant point of sale device 130 or other device using a hardware identifier whitelist. In these examples, the payment processing system 150 maintains a hardware identifier whitelist comprising a listing of hardware identifiers of merchant POS devices 130 and/or back-office servers involved in requests for user account data where the payment processing system 150 has successfully validated a received random nonce and/or merchant beacon device 120 identifier received in the request. In this example, when a device hardware identifier is added to the whitelist, a current timestamp logged at the time that the request for user account data from the device associated with that particular hardware identifier is logged in the whitelist as being associated with the hardware identifier. In an example, the payment processing system 150 deletes a particular listing in the hardware identifier whitelist when a threshold period of time after the time associated with the current timestamp associated with the listing passes. For example, the payment processing system 150 deletes a listing comprising a hardware identifier and an associated current timestamp an hour after the time associated with the current timestamp. In this example, for a particular listing comprising "Device 184953—Jan. 22, 2016 8:35:00 a.m. Eastern Time," the payment processing system 150 may automatically delete that particular listing for Device 184953 from the hardware identifier whitelist at 9:35 a.m. on the same day, Jan. 22, 2016.

In an example, the payment processing system 150 receives one or more subsequent requests from the merchant point of sale device 130 for user payment account data associated with user computing devices 110 currently at the merchant system location. In a subsequent request for user account data, the merchant point of sale device 130 may be unable to receive and/or transmit a merchant beacon device identifier and/or random nonce associated with the merchant beacon device. In another example, the payment processing system 150 may be unable to validate a received merchant beacon device identifier and/or random nonce. In an example of a subsequent request for user account data, a user 101 at the merchant location initiates a transaction at the merchant point of sale device 130. The merchant point of sale device 130, in response to an input by an operator of the merchant point of sale device, transmits to the payment processing system 150 a subsequent request for user payment account data associated with user computing devices 110 currently at the merchant system location. The merchant point of sale device 130 may be unable to retransmit to the payment processing system the beacon device code and/or the random nonce broadcasted by the beacon device. The payment processing system 150 receives, along with the request for user payment account data, a merchant point of sale device 130 hardware identifier or network device hardware identifier associated with a back-office server responsible for communication between multiple point of sale devices 130 at the merchant system location and the payment processing system 150. The payment processing system 150 logs a current timestamp in response to receiving the request for user account data from the merchant point of sale device 130. The payment processing system 150 determines that the request for user account data does not comprise a beacon device 120 code and/or random nonce. In another example, the payment processing system 150 is unable to verify the beacon device code and/or random nonce.

In an example, the payment processing system 150, in response to determining that the payment processing system 150 is unable to verify the beacon device 120 code and/or random nonce or in response to determining that the payment processing system 150 did receive a beacon device 120 code and/or random nonce in association with the subsequent request for user account data, determines whether the received hardware identifier associated with the subsequent request for user account data is currently listed on the hardware identifier whitelist. In an example, if the received hardware identifier is not currently listed on the hardware identifier whitelist, the payment processing system 150 denies the subsequent request for account data. In this example, if the received hardware identifier is currently listed on the hardware identifier whitelist, the payment processing system 150 grants the subsequent request for account data and transmits the user identifiers for user 101 accounts associated with user computing devices 110 currently at the merchant system location.

In an example subsequent transaction, at a time after receiving the user identifiers for user 101 accounts associated with user computing devices 110 at the merchant system location in response to a successful validation of the point of sale device 130 by the payment processing system 150 using the whitelist, the merchant point of sale device 130 operator determines the identity of the user 101 and selects a user 101 identifier corresponding to the user 101. The payment processing system 150 receives an indication of the selection of the user 101 identifier and transmits payment account information associated with one or more payment accounts of the user 101 corresponding to the selected user 101 identifier. The payment processing system 150 receives an indication of a selection by the point of sale device operator of a particular payment account of the user 101 and transaction details. The payment processing system 150 communicates a transaction authorization request to an issuer system 140 associated with the selected payment account to process the transaction according to the transaction details. The payment processing system 150 receives an approval of the transaction authorization request and transmits a receipt to the merchant point of sale device 130.

By using and relying on the methods and systems described herein, the payment processing system, the merchant beacon device, the user computing device, and the merchant point of sale device enable the user to conduct a transaction with the merchant system without the user having to interact with the user computing device or produce identity documents or physical payment cards, as required in some current technology. Further, the payment processing system, the merchant beacon device, the user computing device, and the merchant point of sale device enable verification of the proximity of the merchant point of sale device to the merchant beacon device and user computing device at the merchant system location. Further, the payment processing system, the merchant beacon device, the user computing device, and the merchant point of sale device enable backup verification of the proximity of the merchant point of sale device to the merchant beacon device and user computing device at the merchant system location for a threshold length of time based on a previous verification. As such, the systems and methods described herein may lower the risk of unauthorized access to user payment account data by illegitimate devices pretending to be the merchant point of sale device. Also, the systems and methods described herein may increase the stability and decrease interruptions of verifications of merchant point of sale devices requesting user data by providing a backup verification procedure for a threshold length of time based on a previous verifications of merchant point of sale devices for use when a preferred verification procedure is not available.

Example System Architecture

Turning now to the drawings, in which like numerals indicate like (but not necessarily identical) elements throughout the figures, examples are described in detail.

FIG. 1 is a block diagram depicting a system 100 for verifying the legitimacy of merchant point of sale devices 130 requesting access to user financial account data associated with a user 101 conducting a hands-free transaction at a merchant system location, in accordance with certain examples. As depicted in FIG. 1, the system 100 includes network computing devices 110, 120, 130, 140, and 150 that are configured to communicate with one another via one or more networks 160 and or local wireless networks 170. In some embodiments, a user associated with a device must install an application and/or make a feature selection to obtain the benefits of the techniques described herein.

In examples, the network 160 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, NFC, or any combination thereof or any other appropriate architecture or system that facilitates the communication of signals, data, and/or messages. Throughout the discussion of examples, it should be understood that the terms "data" and "information" are used interchangeably herein to refer to text, images, audio, video, or any other form of information that can exist in a computer-based environment.

Each network computing device 110, 120 130, 140, and 150 includes a device having a communication module capable of transmitting and receiving data over the network 160. For example, each network computing device 110, 120, 130, 140 and 150 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example depicted in FIG. 1, the network computing devices 110, 120, 130, 140 and 150 are operated by users 101, merchant beacon device 120 operators, merchant point of sale ("POS") device 130 operators, issuer system 140 operators, and payment processing system 150 operators, respectively.

An example user computing device 110 comprises a user interface 111, an antenna 112, a digital wallet application 113, a data storage unit 114, a Wi-Fi controller 115, a web browser 118, and a communication application 119.

In an example, the user interface 111 enables the user 101 to interact with the digital wallet application 113 and/or web browser 118. For example, the user interface 115 may be a touch screen, a voice-based interface, or any other interface that allows the user 101 to provide input and receive output from an application or module on the user computing device 110. In an example, the user 101 interacts via the user interface 111 with the digital wallet application 113 and/or web browser 118 to configure user 101 accounts on the payment processing system 150. In another example, the user 101 interacts via the user interface 111 with the digital wallet application 113 and/or the web browser 118 to enable hands-free payments, if needed.

In an example, the antenna 112 is a means of communication between the user computing device 110 and a merchant beacon device 120 and/or a merchant point of sale device 130. In an example, a Wi-Fi controller 115 outputs through the antenna 112 a radio signal, or listens for radio signals from the merchant beacon device 120 and/or the merchant point of sale device 130. In another example, the user computing device 110 comprises a Bluetooth controller or a near field communication ("NFC") controller.

In an example, the digital wallet application 113 is a program, function, routine, applet, or similar entity that exists on and performs its operations on the user computing device 110. In certain examples, the user 101 must install the digital wallet application 113 and/or make a feature selection on the user computing device 110 to obtain the benefits of the techniques described herein. In an example, the user 101 may access the digital wallet application 113 on the user computing device 110 via the user interface 111. In an example, the digital wallet application 113 may be associated with the payment processing system 150.

In certain examples, one or more functions herein described as performed by the digital wallet application 113 may also be performed by a web browser 118 application, for example, a web browser 118 application associated with a merchant system website or associated with the payment processing system 150. In certain examples, one or more functions herein described as performed by the digital wallet application 113 may also be performed by the user computing device 110 operating system. In certain examples, one or more functions herein described as performed via the web browser 118 may also be performed via the digital wallet application 113.

In an example, the data storage unit 114 comprises a local or remote data storage structure accessible to the user computing device 110 suitable for storing information. In an example, the data storage unit 114 stores encrypted information, such as HTML5 local storage.

In an example, the Wi-Fi controller 115 is capable of sending and receiving data, performing authentication and ciphering functions, and directing how the user computing device 110 will listen for transmissions from the merchant beacon device 120 or merchant point of sale device 130 and is capable of configuring the user computing device 110 into various power-save modes according to Wi-Fi-specified procedures. In another example, the user computing device 110 comprises a Bluetooth controller or an NFC controller capable of performing similar functions according to appropriate wireless communication protocols. An example Wi-Fi controller 115 communicates with the digital wallet application 113 and is capable of sending and receiving data over a wireless, Wi-Fi communication channel or other local wireless network 170. In another example, a Bluetooth controller or NFC controller performs similar functions as the Wi-Fi controller 115 using Bluetooth or NFC protocols. In an example, the Wi-Fi controller 115 activates the antenna 112 to create a wireless communication channel between the user computing device 110 and the merchant beacon device 120 and/or the merchant point of sale device 130. The user computing device 110 communicates with the merchant beacon device 120 and/or the merchant point of sale device 130 via the antenna 112. In an example, when the user computing device 110 has been activated, the Wi-Fi controller 115 polls through the antenna 112 a radio signal, or listens for radio signals from the merchant beacon device 120 and/or merchant point of sale device 130.

An example GPS module 117 periodically logs user computing device 110 location data when a user 101 is signed in to the digital wallet application 113 and when the user 101 has configured the user's 101 payment processing system account to enable the payment processing system 150 to receive location data logged by the user computing device 110. In an example, logging location data comprises logging a current timestamp and determining and storing location coordinates, such as global positioning system ("GPS") coordinates, corresponding to the actual or approximate location of the user computing device 110 at the time associated with the current timestamp.

In an example, the user 101 can use a communication application 119, such as a web browser 118 application or a stand-alone application, to view, download, upload, or otherwise access documents or web pages via a distributed network 160.

In an example, the web browser 118 can enable the user 101 to interact with web pages using the user computing device 110. In an example, the user 101 may access the user's 101 account maintained by the payment processing system 150 via the web browser 118. In certain examples described herein, one or more functions performed by the digital wallet application 113 may also be performed by a web browser 118 application associated with the payment processing system 150.

In an example, the communication application 119 can interact with web servers or other computing devices connected to the network 160, including the user computing device 110 and a web server of a merchant system.

An example merchant beacon device 120 comprises an antenna 122 and a Wi-Fi controller 125. In an example, a merchant system location comprises one or more merchant beacon devices 120 installed at the merchant system location. In an example, each installed merchant beacon device 120 is associated by a payment processing system 150 with a particular merchant point of sale device 130 installed at the merchant system location. For example, the payment processing system 150 may comprise a database that correlates merchant beacon device 120 identifiers with merchant point of sale device 130 identifiers for associated merchant point of sale devices 130. For example, a merchant point of sale device 130 identifier may comprise hardware identifier specific to the device such as a serial number or a MAC ID. In another example, a merchant beacon device 120 identifier may comprise a hardware identifier specific to the beacon device or an identifier generated by the payment processing system 150 and stored in the merchant beacon device 120. In another example, each installed merchant beacon device 120 is associated by the payment processing system 150 with a merchant location identifier associated with the merchant system location at which the merchant beacon devices 120 are installed.

An example merchant beacon device 120 is programmed to broadcast, emit, or otherwise transmit a particular merchant beacon device 120 identifier over a local wireless network 170 to any user computing devices 110 within a threshold distance required to maintain the wireless network 160. For example, wireless network communications among user computing devices 110, merchant beacon devices 120 and/or merchant point of sale devices 130 at the merchant system location occur over a local wireless network 170 at the merchant system location. For example, the wireless network 170 may comprise a Wi-Fi network, a Bluetooth network, an NFC network, or any other appropriate local wireless network 170.

In an example, the antenna 122 is a means of communication between the merchant beacon device 120 and one or more user computing devices 110 and between the merchant beacon device 120 and an associated merchant point of sale device 130. In an example, a Wi-Fi controller 125 outputs through the antenna 122 a radio signal, or listens for radio signals from one or more user computing devices 110 and/or an associated merchant system point of sale device 130. In another example, the merchant beacon device 120 comprises a Bluetooth controller or a near field communication ("NFC") controller.

In an example, the data storage unit 124 comprises a local or remote data storage structure accessible to the merchant beacon device 120 suitable for storing information. In an example, the data storage unit 124 stores encrypted information, such as HTML5 local storage.

In an example, the Wi-Fi controller 125 is capable of sending and receiving data, performing authentication and ciphering functions, and directing how merchant beacon device 120 will listen for transmissions from one or more user computing devices 110 and/or from an associated merchant point of sale device 130 and is capable of configuring the merchant beacon device 120 into various power-save modes according to Wi-Fi-specified procedures. In another example, the merchant beacon device 120 comprises a Bluetooth controller or an NFC controller capable of performing similar functions. An example Wi-Fi controller 125 communicates with the digital wallet application 113 of the user computing device 110 and is capable of sending and receiving data over a wireless, Wi-Fi communication channel or other appropriate local wireless network 170 at the merchant system location. In another example, a Bluetooth controller or NFC controller performs similar functions as the Wi-Fi controller 125 using Bluetooth or NFC protocols. In an example, the Wi-Fi controller 125 activates the antenna 122 to create a wireless communication channel between the user computing device 110 and the merchant beacon device 120 or between the merchant point of sale device 130 and the merchant beacon device 120. The merchant beacon device 120 communicates with the user computing device 110 and/or the merchant point of sale device 130 via the antenna 122. In an example, when the merchant beacon device 120 has been activated, the Wi-Fi controller 125 polls through the antenna 122 a radio signal, or listens for radio signals from the user computing device 110 and/or the merchant point of sale device 130.

An example merchant point of sale device 130 comprises a user interface 131, an antenna 132, a payment application 133, a data storage unit 134, a Wi-Fi controller 135, and a communication application 139.

In an example, the user interface 131 enables the merchant POS device 130 operator to interact with the merchant POS device 130. For example, the user interface 131 may be a touch screen, a voice-based interface, or any other interface that allows the merchant POS device 130 operator to provide input and receive output from an application or module on the merchant POS device 130. In an example, the merchant POS device 130 operator interacts via the user interface 131 with the payment application 133.

An example antenna 132 is a means of communication between the merchant POS device 130 and an associated merchant beacon device 120 and/or one or more user computing devices 110. In an example, a Wi-Fi controller 135 outputs through the antenna 132 a radio signal, or listens for radio signals from the merchant beacon device 120 and/or the one or more user computing devices 110. In another example, the merchant point of sale device 130 comprises a Bluetooth controller or a near field communication ("NFC") controller.

In an example, the payment application 133 comprises a program, function, routine, applet, or similar entity that exists on and performs its operations on the merchant point of sale device 130. In certain examples, the merchant point of sale ("POS") device operator or other merchant system operator must install the payment application 133 and/or make a feature selection on the merchant point of sale device 130 to obtain the benefits of the techniques described herein. In an example, the merchant POS device operator may access the payment application 133 on the merchant POS device 133 via the user interface 131. In an example, the payment application 133 may be associated with and may communicate with the payment processing system 150 via the network 160. In another example, the payment application 133 may be associated with a merchant system associated with the merchant beacon device 120.

In an example, the data storage unit 134 comprises a local or remote data storage structure accessible to the merchant POS device 130 suitable for storing information. In an example, the data storage unit 134 stores encrypted information, such as HTML5 local storage.

An example Wi-Fi controller 135 is capable of sending and receiving data, performing authentication and ciphering functions, and directing how the merchant POS device 130 will listen for transmissions from one or more user computing devices 110 and/or from an associated merchant beacon device 120 and is capable of configuring the merchant point of sale device 130 into various power-save modes according to Wi-Fi-specified procedures. In another example, the merchant POS device 130 comprises a Bluetooth controller or an NFC controller capable of performing similar functions. An example Wi-Fi controller 135 communicates with the payment application 133 of the merchant POS device 130 and is capable of sending and receiving data over a wireless, Wi-Fi communication channel or other appropriate local wireless network 170 at the merchant system location. In another example, a Bluetooth controller or NFC controller performs similar functions as the Wi-Fi controller 135 using Bluetooth or NFC protocols. In an example, the Wi-Fi controller 135 activates the antenna 132 to create a wireless communication channel between one or more user computing devices 110 and the merchant point of sale device 130 or between the merchant beacon device 120 and the merchant point of sale device 130. The merchant POS device 130 communicates with one or more user computing devices 110 and/or the merchant beacon device 120 via the antenna 122. In an example, when the merchant POS device 130 has been activated, the Wi-Fi controller 135 polls through the antenna 132 a radio signal, or listens for radio signals from one or more user computing devices 110 and/or the merchant beacon device 120.

In an example, the communication application 139, such as a web browser application or a stand-alone application, enables an operator of the merchant POS device 130 to view, download, upload, or otherwise access documents or web pages via a distributed network 160. For example, the communication application 139 may enable communication of data from the payment application 113 over the network 160 with the payment processing system 150. In this example, the communication application 139 may enable communication of data to the payment application 113 over the network 160 from the payment processing system 150.

An example issuer system 140 approves or denies a payment authorization request received from the payment processing system 150. In an example, the issuer system 140 communicates with the payment processing system 150 over the network 160. In an example, the issuer system 140 communicates with an acquirer system to approve a credit authorization and to make payment to the payment processing system 150 and/or merchant system associated with the merchant POS device 130. For example, the acquirer system is a third party payment processing company.

An example payment processing system 150 comprises an account management module 151, a transaction processing module 153, a data storage unit 154, a server 158, and a website 159.

In an example, the account management module 151 manages one or more user 101 accounts. In an example, a user 101 account may comprise a digital wallet account, an email account, a social networking account, or any other appropriate account associated with the payment processing system 150. In an example, the account management module 151 communicates with a digital wallet application 113 operating on a user computing device 110 associated with a user 101 having a user 101 account with the payment processing system 150. In an example, the user 101 enters payment account information into the user 101 account via the digital wallet application 113 and the account management module 151 receives the payment account information over the network 160 from the user computing device 110 and associates the received payment account information with the user 101 account.

In an example, the transaction processing module 153 periodically assigns a new random nonce and a new merchant beacon device 120 code to a merchant beacon device 120 associated with a merchant POS device 130 at the merchant system location. In another example, the transaction processing module 153 periodically assigns a new random nonce and a new merchant beacon device 120 code to a merchant beacon device 120 associated with a merchant system location identifier. In an example, the transaction processing module 153 encrypts the random nonce with a shared encryption key shared between the payment processing system 150 and the merchant POS device 130.

In an example, transaction processing module 153 validates a merchant point of sale device requesting user payment account information. For example, the transaction processing module 153 verifies that a point of sale device identifier and associated password received from the merchant POS device 130 are correct. In another example, the transaction processing module 153 verifies that a merchant beacon device 120 code received from the point of sale device 130 corresponds to the merchant beacon device 120 code associated with the merchant point of sale device 120 identifier in a database of the payment processing system 150. In yet another example, the transaction processing module 153 verifies that a random nonce received from the point of sale device corresponds to a random nonce associated with the merchant point of sale 120 device identifier in the database of the payment processing system 150. In an example, if the transaction processing module 153 determines that one or more of the received merchant point of sale device identifier, password, merchant beacon device code, and/or random nonce are invalid, the transaction processing module 153 denies the merchant point of sale device 130 request for user 101 payment account information. In another example, if the transaction processing module 153 determines that the requesting merchant point of sale device is legitimate based on one or more of the received merchant point of sale device 130 identifier, username and password, merchant beacon device code, and/or random nonce, the transaction processing module 153 identifies user 101 account identifiers associated with user computing devices 110 from which the matching beacon device 120 code has been received and having location data within a threshold proximity to a known location of the merchant beacon device 120. For example, the transaction processing module 153 identifies user 101 account identifiers for all users having digital wallet accounts with the payment processing system who are both signed in to the digital wallet application 113 and are present at the merchant system location within a network proximity to the merchant beacon device 120. The payment processing system transmits the identified user 101 account identifiers to the merchant point of sale device 130 over the network 160.

In an example, the transaction processing module 153 receives transaction details from a merchant POS device 130 and a request to initiate a transaction. Example transaction details comprise merchant system account information, a total amount of the transaction, and a user 101 selection of a user 101 payment account associated with the user's 101 account with the payment processing system 150. For example, the user's 101 account is a digital wallet account comprising one or more payment account information corresponding to one or more respective payment accounts of the user 101.

In an example, the transaction processing module 153 extracts payment account information from the user 101 account corresponding to the user 101 selection of the user 101 payment account received in the transaction details from the merchant POS device 130. In an example, the transaction processing module 153 transmits a payment authorization request to an issuer system 140 or other appropriate financial institution associated with the payment account selected by the user 101 for use in the transaction. An example payment authorization request may comprise merchant system payment account information, user 101 payment account information, and a total amount of the transaction. In an example, after the issuer system 140 processes the payment authorization request, the transaction processing module 153 receives an approval or denial of the payment authorization request from the issuer system 140 over the network 160. In an example, the transaction processing module 153 transmits a receipt to the merchant POS device 130 and/or the user computing device 110 comprising a summary of the transaction.

In an example, the data storage unit 154 comprises a local or remote data storage structure accessible to the payment processing system 150 suitable for storing information. In an example, the data storage unit 154 stores encrypted information, such as HTML5 local storage.

It will be appreciated that the network connections shown are example and other means of establishing a communications link between the computers and devices can be used. Moreover, those having ordinary skill in the art having the benefit of the present disclosure will appreciate that the user computing device 110, the merchant beacon device 120, the merchant point of sale device 130, the issuer system 140, and the payment processing system 150 illustrated in FIG. 1 can have any of several other suitable computer system configurations. For example, a user computing device 110 embodied as a mobile phone or handheld computer may or may not include all the components described above.

Figure 11:
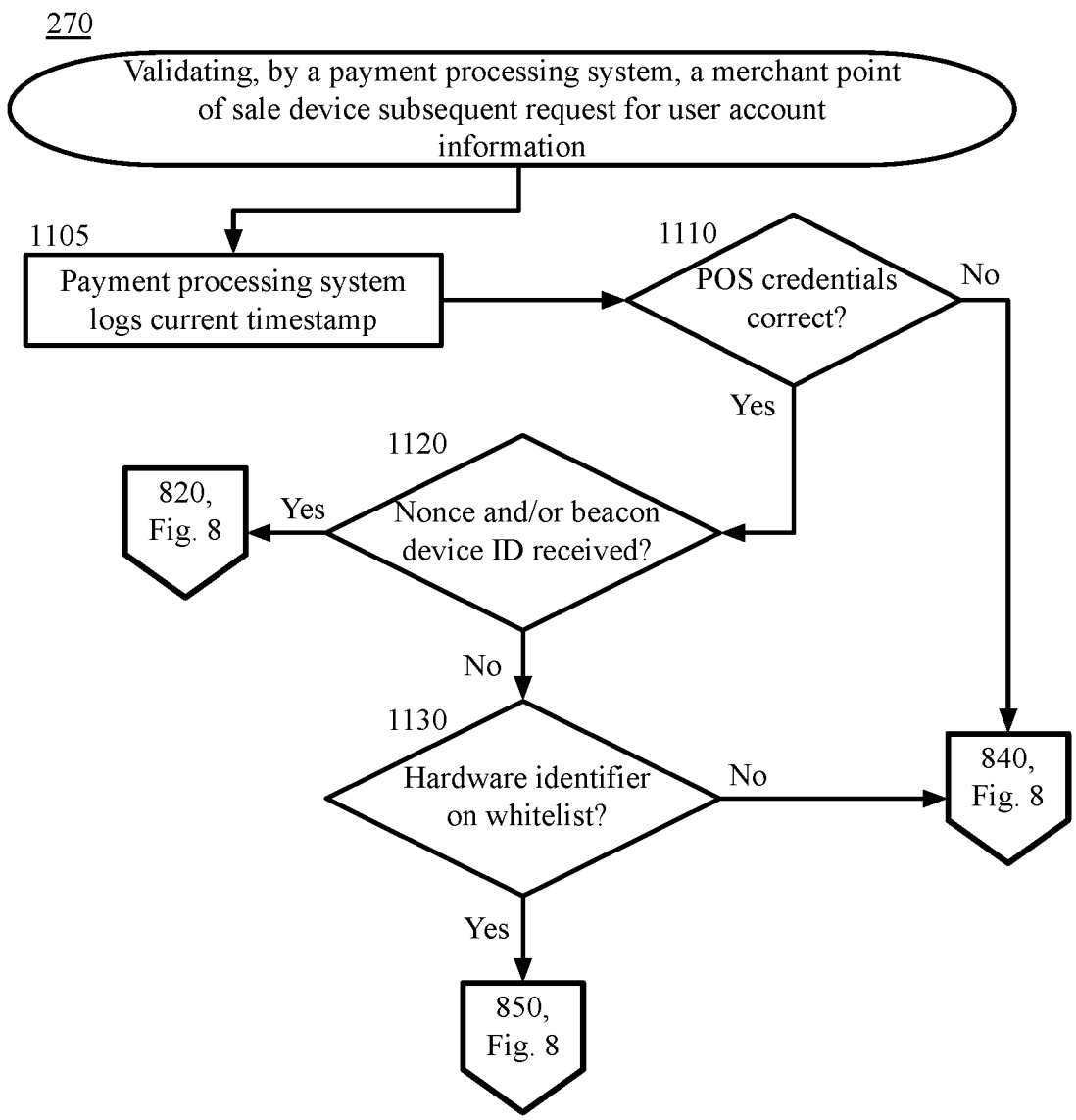
FIG. 11 is a block flow diagram depicting a method for validating, by a payment processing system, a merchant point of sale device subsequent request for user account information, in accordance with certain examples

In examples, the network computing devices and any other computing machines associated with the technology presented herein may be any type of computing machine such as, but not limited to, those discussed in more detail with respect to FIG. 11. The computing machines discussed herein may communicate with one another as well as other computing machines or communication systems over one or more networks, such as the network 160 or the local wireless network 170. The network 160 or local wireless network 170 may include any type of data or communications network, including any of the network technology discussed with respect to FIG. 12.

In examples, the network computing devices and any other computing machines associated with the technology presented herein may be any type of computing machine such as, but not limited to, those discussed in more detail with respect to FIG. 11. Furthermore, any functions, applications, or components associated with any of these computing machines, such as those described herein or any other others (for example, scripts, web content, software, firmware, hardware, or modules) associated with the technology presented herein may by any of the components discussed in more detail with respect to FIG. 12. The computing machines discussed herein may communicate with one another, as well as with other computing machines or communication systems over one or more networks, such as network 160 or 170. The network 160 or 170 may include any type of data or communications network, including any of the network technology discussed with respect to FIG. 12.

Example Processes

The example methods illustrated in FIGS. 2-11 are described hereinafter with respect to the components of the example operating environment 100. The example methods of FIGS. 2-11 may also be performed with other systems and in other environments.

Figure 2:
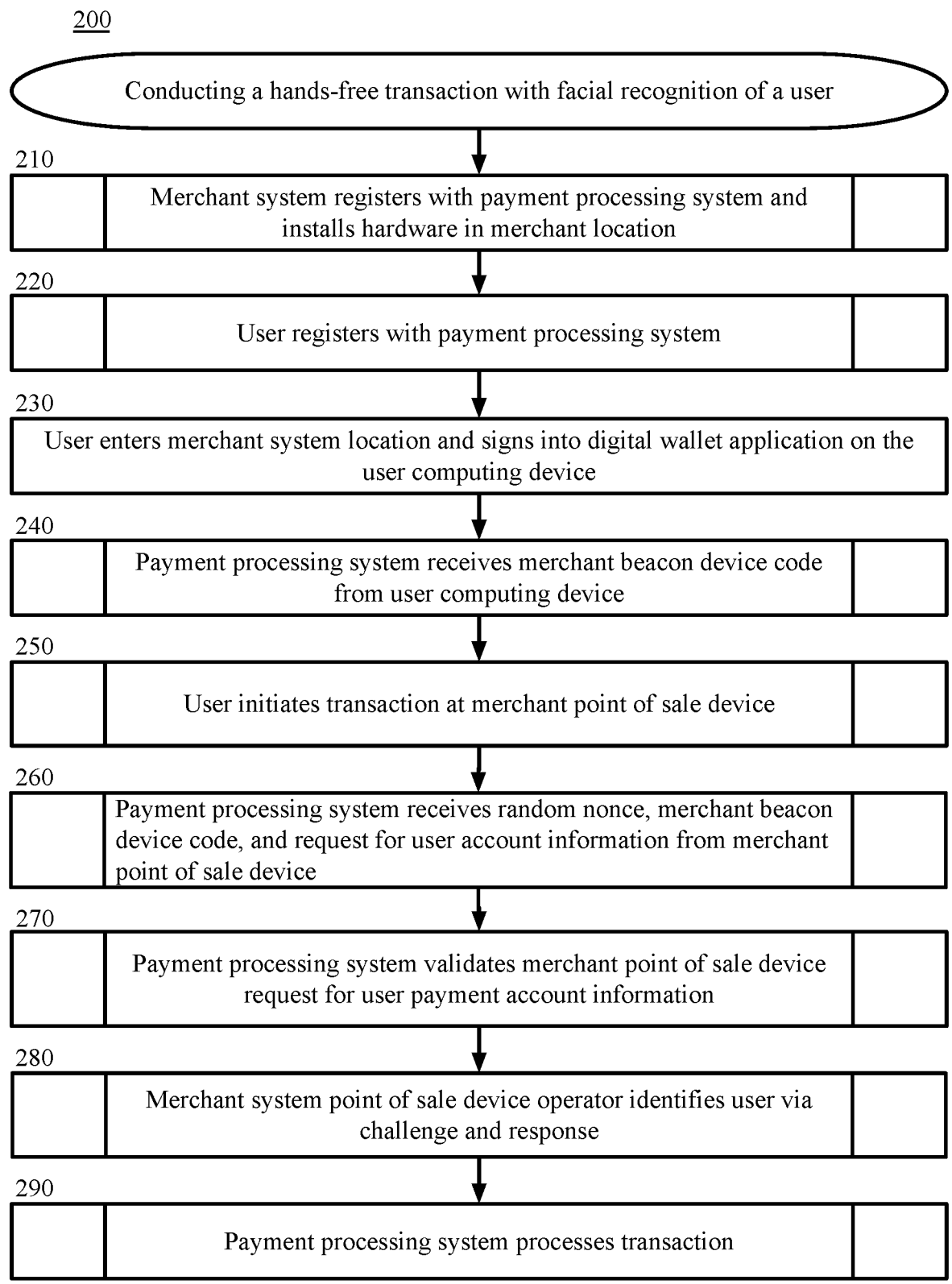
FIG. 2 is a block flow diagram depicting a method for verifying the legitimacy of point of sale devices requesting access to user financial account data associated with a user conducting a hands-free transaction at a merchant system location, in accordance with certain examples.

FIG. 2 is a block diagram depicting a method 200 for verifying the legitimacy of point of sale devices 130 requesting access to user 101 financial account data associated with a user 101 conducting a hands-free transaction at a merchant system location, in accordance with certain examples. The method 200 is described with reference to the components illustrated in FIG. 1.

In block 210, the merchant system registers with the payment processing system 150 and installs hardware at a merchant location. The method for registering, by a merchant system, with a payment processing system 150 and installing hardware at a merchant system location is described in more detail hereinafter with reference to the method described in FIG. 3.

Figure 3:
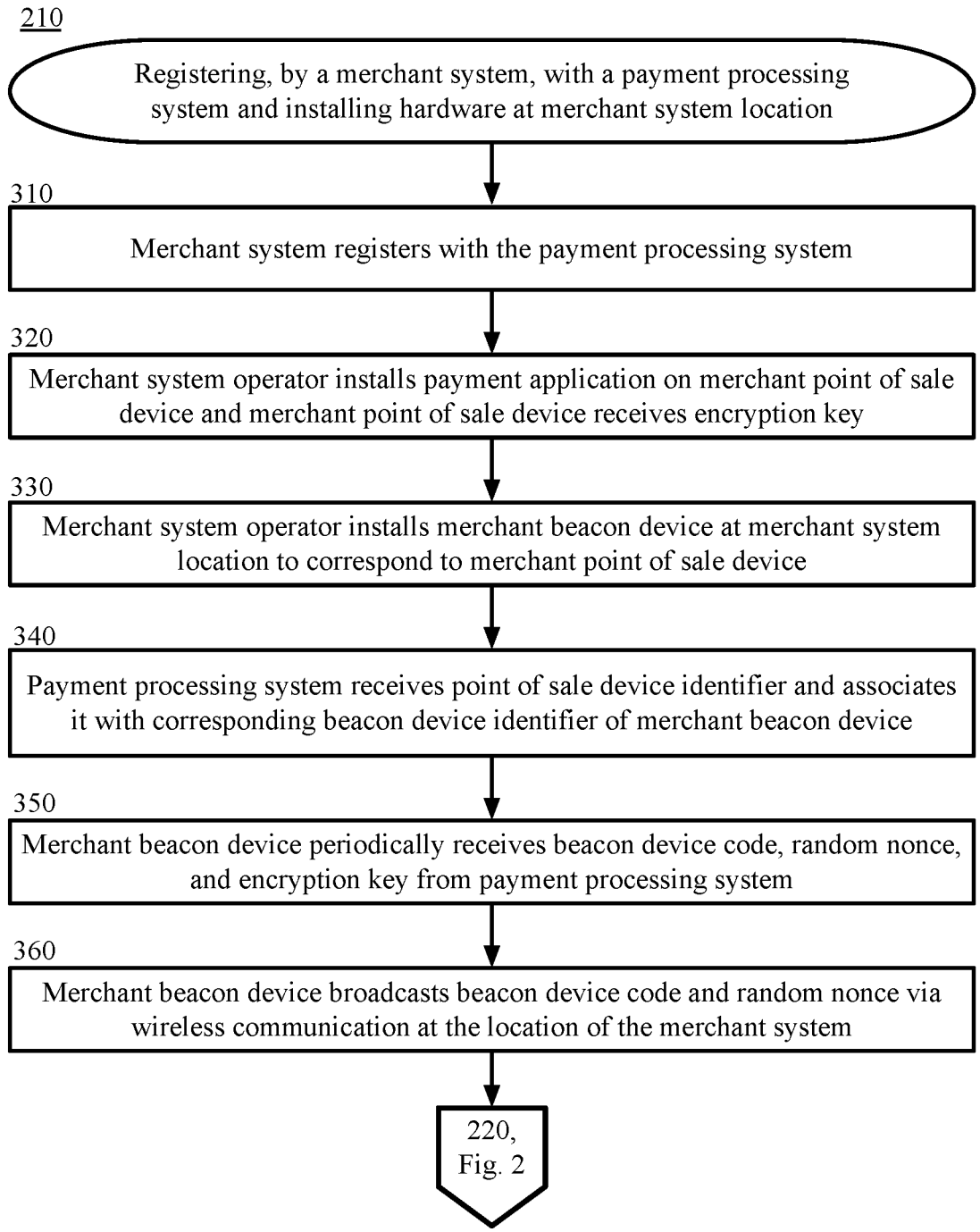
FIG. 3 is a block flow diagram depicting a method for registering, by a merchant system, with a payment processing system and installing hardware at a merchant system location, in accordance with certain examples.

FIG. 3 is a block diagram depicting a method 210 for registering, by a merchant system, with a payment processing system 150 and installing hardware at a merchant system location, in accordance with certain examples. The method 210 is described with reference to the components illustrated in FIG. 1.

In the examples described herein, the merchant system does not need to install hardware, for example, one or more merchant beacon devices 120 and one or more merchant POS devices 130, at the example merchant system location in any particular order. The method 210 describes one example method of installing hardware at the merchant location. However, the merchant system or other system installing the merchant hardware does not need to install the one or more merchant POS device 130 or the one or more merchant beacon devices 120 in the order described herein.

In block 310, a merchant system registers with the payment processing system 150. In an example, an agent of the merchant system accesses a payment processing system website 159 and registers for a merchant system account with the payment processing system 150 via the website 159. In an example, the merchant system adds payment account information associated with a merchant system payment account to the merchant account managed by the payment processing system 150. In an example, the merchant system comprises one or more merchant system locations. For example, the merchant system may comprise one or more physical store locations. An example merchant location comprises one or more merchant point of sale ("POS") devices 130. In an example, one or more merchant POS device operators operate the one or more merchant POS devices 130 at the merchant system location.

In block 320, a merchant system operator installs the payment application 133 on the merchant point of sale device 130 and the merchant point of sale device 130 receives an encryption key. In another example, the merchant system operator purchases a merchant POS device 130 from the payment processing system 150 with the payment application 133 and an encryption key pre-installed on the merchant POS device 130. In an example, the merchant POS device 130 is able to communicate with the payment processing system 150 over a network 160 to receive the payment application 113 and/or encryption key. In an example, the merchant POS device 130 communicates with the payment processing system 150 via the payment application 133 over the network 160. For example, the merchant POS device 130 may be able to transmit transaction details to the payment processing system 150 via the payment application 133 over the network 160 to enable the payment processing system 150 to process a transaction. In another example, the merchant POS device 130 may be able to receive a receipt from the payment processing system 150 that notifies a merchant POS device operator whether a transaction was successful or not.

In block 330, the merchant system operator installs a merchant beacon device 120 at the merchant system location to correspond to the merchant POS device 130. In an example, the merchant system operator installs each merchant beacon device 120 in proximity to an associated merchant POS device 130. An example merchant beacon device 120 is programmed to broadcast, emit, or otherwise transmit a particular merchant beacon device 120 identifier over a wireless network 150 to any user computing devices 110 within a threshold distance required to maintain the wireless network 160.

In block 340, the payment processing system 150 receives the merchant point of sale device 130 identifier and associates it with a corresponding merchant beacon device 120 identifier of a merchant beacon device 120. In another example, the payment processing system 150 associates the merchant point of sale device 130 identifier with a merchant system location identifier corresponding to the merchant system location at which the point of sale device 130 is installed. In an example, each installed merchant beacon device 120 is associated by a payment processing system 150 with a particular merchant point of sale device 130 installed at the merchant system location. For example, the payment processing system 150 may comprise a database that correlates merchant beacon device 120 identifiers with merchant point of sale device 130 identifiers and/or merchant system location identifiers for associated merchant point of sale devices 130 and/or merchant system locations. For example, a merchant point of sale device 130 identifier may comprise hardware identifier specific to the device such as a serial number or a MAC ID. In another example, a merchant beacon device 120 identifier may comprise a hardware identifier specific to the beacon device or an identifier generated by the payment processing system 150 and stored in the merchant beacon device 120. An example merchant system location identifier comprises an identifier uniquely identifying a particular merchant system location.

In block 350, the merchant beacon device 120 periodically receives a beacon device code and/or a random nonce from the payment processing system. In an example, a beacon device code comprises a randomly generated code comprising alphanumeric and/or symbolic characters. For example, the payment processing system 150 comprises a beacon device code generator that generates random beacon device codes. In this example, the payment processing system 150, for each merchant beacon device 120 at the merchant system location, generates a new beacon device code at predefined intervals. For example, the payment processing system 150 generates a new beacon device code for a merchant beacon device 120 every five minutes. In an example, the payment processing system 150, in response to generating a new beacon device code, transmits each new beacon device code to the merchant beacon device 120 via the network 160. In an example, the merchant beacon device 120 also periodically receives a random nonce from the payment processing system 150 via the network 160. For example, the payment processing system 150 generates and transmits a random nonce to the merchant beacon device 120 at predefined intervals, for example, every thirty seconds. In this example, the payment processing system 150 may comprise a random number generator to generate the random nonce. An example random nonce may comprise one or more alphanumeric and/or symbolic characters. In an example, the random nonce generated by the payment processing system 150 comprises an encrypted random nonce. For example, the payment processing system 150 encrypts the random nonce using the encryption key shared with the merchant POS device 130. In this example, the merchant beacon device 120 periodically receives a new encrypted beacon device code from the payment processing system 150 via the network 160.

In block 360, the merchant beacon device 120 broadcasts the beacon device code and the random nonce via a wireless communication network 160 at the location of the merchant system. In an example, the merchant beacon device 120 broadcasts a beacon device code received from the payment processing system 150 via a local wireless network 170 at the merchant system location until receiving a new beacon device code from the payment processing system 150. In this example, in response to receiving the new beacon device code from the payment processing system 150 via the network 160, the merchant beacon device 120 broadcasts the new beacon device code at the merchant system location via the local wireless network 170 until receiving a subsequent new beacon device code from the payment processing system 150. In an example, the merchant beacon device 120 broadcasts an encrypted or unencrypted random nonce received from the payment processing system 150 via a local wireless network 170 at the merchant system location until receiving a new encrypted or unencrypted random nonce from the payment processing system 150. In this example, in response to receiving the new encrypted or unencrypted random nonce from the payment processing system 150 via the network 160, the merchant beacon device 120 broadcasts the new encrypted or unencrypted random nonce at the merchant system location via the local wireless network 170 until receiving a subsequent new beacon device code from the payment processing system 150.

In an example, the merchant beacon device 120 broadcasts the merchant beacon code and/or random nonce over a wireless network 160 medium, wherein one or more user computing devices 110 located within a threshold proximity to the merchant beacon device 120 are able to receive the device code over the local wireless network 170. In an example, only user computing devices 110 and/or devices located at the merchant system location are able to establish a predefined proximity to the merchant beacon device 120 to enable communication with the merchant beacon device 120 over the local wireless network 170. For example, the threshold proximity required to establish the local wireless network 170 connection depends on the network 120 communication protocol utilized by the merchant beacon device 120. For example, the merchant beacon device 120 may broadcast, emit, or otherwise transmit data comprising the beacon device code and random nonce via Wi-Fi, Bluetooth, Bluetooth low energy ("BLE"), near field communication ("NFC"), or other appropriate communication protocol to one or more user computing devices 110 located at the merchant system location within a threshold proximity to the merchant beacon device 120. In some examples, the merchant beacon device 120, at a time before transmitting the merchant beacon identifier, is operable to establish a network 160 connection between the merchant beacon device 120 and one or more user computing devices 110 and/or merchant POS devices 130 located at the merchant system location within a threshold proximity to the merchant beacon device 120.

In certain examples, the merchant beacon device 120 is a component of the merchant POS device 130 or is wirelessly or physically connected to the merchant POS device 130 and controlled by one or more processors of the merchant POS device 130. In certain examples, one or more functionalities performed by the merchant beacon device 120 may also be performed by the merchant POS device 130.

From block 360, the method 210 proceeds to block 220 of FIG. 2.

Returning to FIG. 2, in block 220, the user 101 registers with the payment processing system 150. The method for registering, by a user 101, with a payment processing system 150 is described in more detail hereinafter with reference to the method 220 described in FIG. 4.

Figure 4:
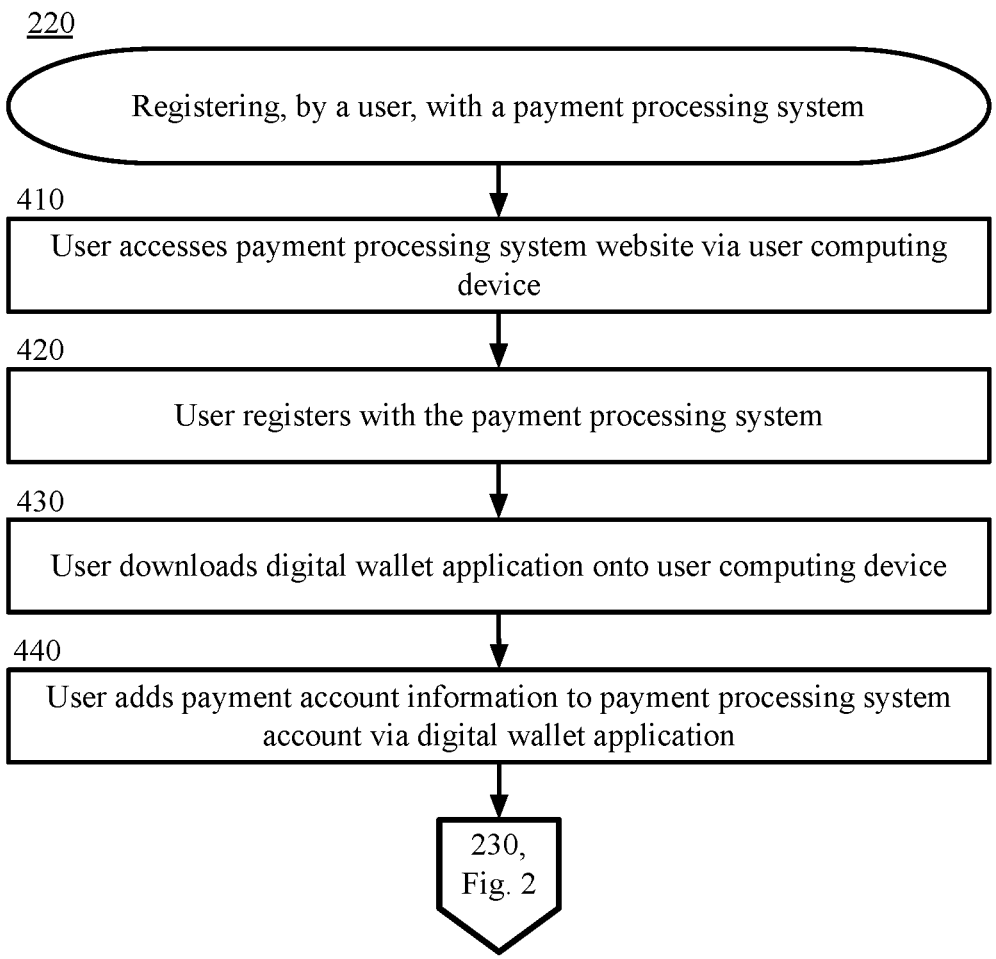
FIG. 4 is a block flow diagram depicting a method for registering, by a user, with a payment processing system, in accordance with certain examples.

FIG. 4 is a block diagram depicting a method 220 for registering, by a user 101, with a payment processing system 150, in accordance with certain examples. The method 220 is described with reference to the components illustrated in FIG. 1.

In block 410, the user 101 accesses the payment processing system website 159. For example, the user 101 accesses the payment processing system 150 via the web browser 118 of the user computing device 110. In another example, the user 101 may otherwise contact the payment processing system 150 to register for a user 101 account.

In block 420, the user 101 registers with the payment processing system 150. The user 101 may obtain a user 101 account number, receive the appropriate applications and software to install on the user computing device 110, request authorization to participate in hands-free payment processing, or perform any action required by the payment processing system 150. The user 101 may utilize the functions of the user computing device 110, such as the user interface 111 and the web browser 118, to register and configure a user 101 account. In an example, the user 101 may enter payment account information associated with one or more user 101 accounts, for example, one or more credit accounts, one or more bank accounts, one or more stored value accounts, and/or other appropriate accounts into the user 101 account maintained by the payment processing system 150.

In block 430, the user 101 downloads the digital wallet application 113 onto the user computing device 110. In an example, the digital wallet application 113 operating on the user computing device 110 is able to communicate with the payment processing system 150 over the network 160.

In block 440, the user 101 adds payment account information to the payment processing system 150 account via the digital wallet application 113. In an example, the user 101 may configure user 101 account settings or add, delete, or edit payment account information via the digital wallet application 113. In an example, the user 101 may select an option to enable or disable the permission of the payment processing system 150 to process hands free transactions. For example, a hands free transaction comprises a transaction wherein the user 101 does not need to interact with the user computing device 110 or requires minimal user 101 interaction with the user computing device 110 to initiate a transaction with the merchant system.

From block 440, the method 220 proceeds to block 230 in FIG. 2.

Returning to FIG. 2, in block 230, the user 101 enters the merchant system location and signs in to the digital wallet application 113 on the user computing device 110. In an example, the user signs into the digital wallet application 113 before entering the merchant system location. In another example, the user 101 signs in to the digital wallet application 113 at the same time or after the user 101 enters the merchant system location. In an example, to sign in to the digital wallet application 113, the user 101 may enter a username and password associated with the user's 101 payment processing system account and select an object on the user interface 111 that reads "sign in." In this example, the digital wallet application 113 communicates the username and password to the payment processing system 150 via the network 160. In this example, the payment processing system 150 validates the username and password for the user 101 account. In this example, if the username and password are correct, the payment processing system 150 establishes communication with the digital wallet application 113 on the user computing device 110 via the network 160.

In block 240, the payment processing system 150 receives the merchant beacon device 120 code from the user computing device 110. The method for receiving, by a payment processing system 150, a merchant beacon device 120 code broadcast by a merchant beacon device 120 is described in more detail hereinafter with reference to the method 240 described in FIG. 5.

Figure 5:
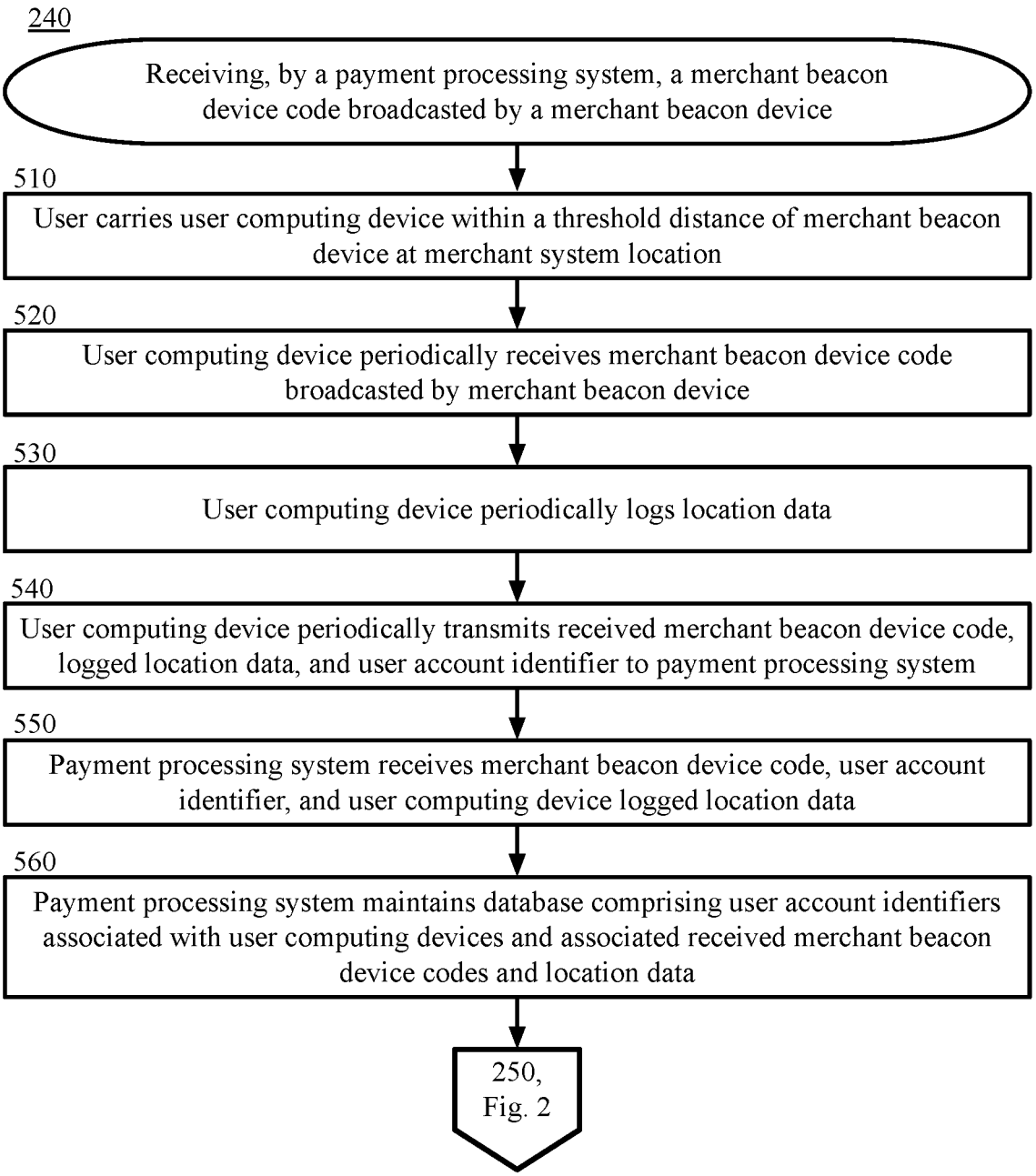
FIG. 5 is a block flow diagram depicting a method for receiving, by a payment processing system, a merchant beacon device code broadcast by a merchant beacon device, in accordance with certain examples.

FIG. 5 is a block diagram depicting a method 230 for receiving, by a payment processing system 150, a merchant beacon device 120 code broadcasted by a merchant beacon device 120, in accordance with certain examples. The method 240 is described with reference to the components illustrated in FIG. 1.

In block 510, the user 101 carries the user computing device 110 within a threshold distance of the merchant beacon device 120 at the merchant system location. In an example, the threshold distance comprises a maximum distance between the merchant beacon device 120 and the user computing device 110 necessary for the user computing device 110 to receive data from the merchant beacon device 120 over a local wireless network 170 at the merchant system location. For example, the user 101 approaches the merchant POS device 130 with the user computing device 110.

In block 520, the user computing device 120 periodically receives the merchant beacon device 120 code broadcasted by the merchant beacon device 120. In an example, the merchant beacon device 120 continuously or periodically broadcasts the merchant beacon device 120 code. For example, the merchant beacon device 120 broadcasts the merchant beacon device 120 code every five seconds. In an example, the user computing device 120 periodically receives the merchant beacon device 120 code according to the frequency that the merchant beacon device 120 transmits the code over the local wireless network 170.

In block 530, the user computing device 110 periodically logs location data. For example, the user computing device 110 logs location data associated with the user computing device 110 every five minutes or other periodic intervals of time if the user 101 is signed in to the digital wallet application 113. The user computing device 110 may also log location device in response to the user 101 signing in to the digital wallet application 113 or in response to another appropriate user 101 input. Logging location data may comprise generating a current timestamp and logging coordinates of a current location of the user computing device 110 via a global positioning system ("GPS") module 117 on the user computing device 110. In this example, the location data comprises the timestamp and the associated position of the user computing device 110 at the time that the timestamp is generated.

In an example, the user 101 configures one or more settings on the user's payment processing system 150 account to enable the payment processing system 150 to receive location data of the user computing device 110 when the user 101 is signed in to the digital wallet application 113. In this example, the payment processing system 150 may receive the location data of the user computing device 110 while the user computing device 110 is signed in to the digital wallet application 113 according to the user's 101 payment processing system account settings. The user 101 may configure one or more settings on the user's payment processing system 150 account to revoke permission of the payment processing system 150 to receive the location data logged by the user computing device 110. The user 101 may give or revoke permission to log the user computing device 110 location via configuring one or more settings on the digital wallet application 113.

In block 540, the user computing device 110 periodically transmits the received merchant beacon device 120 code, the logged location data, and the user 101 account identifier to the payment processing system 150. In another example, the user computing device 110 transmits a most recent known location of the user computing device 110 instead of logged location data. In an example, the user computing device 110 periodically transmits, to the payment processing system 150, all logged location data stored on the user computing device 110, the most recent received merchant beacon device 120 code, and the user 101 account identifier. In an example, the user computing device 110 transmits logged location data, in response to logging location data, to the payment processing system 150 via the network 160 along with the user 101 account identifier. In this example, the user computing device 110 may transmit the logged location data each time the user computing device 110 logs location data or the user computing device 110 may periodically transmit a batch of location data stored by user computing device 110. In an example, the user computing device 110 transmits, each time the user computing device 110 receives a merchant beacon device 120 code from the merchant beacon device 120, the received merchant beacon device 120 code to the payment processing system 150 via the network 160 along with the user 101 account identifier. In another example, the user computing device 110 only sends a first merchant beacon device 120 code once until the user computing device 110 receives a second merchant beacon device 120 code from the merchant beacon device 120 different from the first code.

In block 560, the payment processing system 150 maintains a database comprising user 101 account identifiers associated with user computing devices 110 and associated received merchant beacon device 120 codes and location data. In an example, the database comprises a table or other organizational scheme that correlates user 101 account identifiers with merchant beacon device 120 codes and location data received from user computing devices 110 associated with the user 101 account identifiers. In an example, the payment processing system 150 database may further correlate the merchant system name, an address derived from the location data, the merchant POS device 130 associated with the merchant beacon device 120, and any other useful or relevant information with the user 101 account identifier, merchant beacon device 120 code, and location data received from each particular user computing device 110.

From block 560, the method 240 proceeds to block 250 in FIG. 2.

Returning to FIG. 2, in block 250, the user 101 initiates a transaction at the merchant point of sale device 130. The method for initiating, by a user 101, a transaction at a merchant point of sale device 130 is described in more detail hereinafter with reference to the method 250 described in FIG. 6. In the examples described herein, the user 101 initiates a "hands free transaction" at the merchant POS device 130. An example hands free transaction does not require any interaction with the user computing device 110 on the part of the user 101. In another example, a hands free transaction requires only minimal interaction with the user computing device 110 by the user 101.

Figure 6:
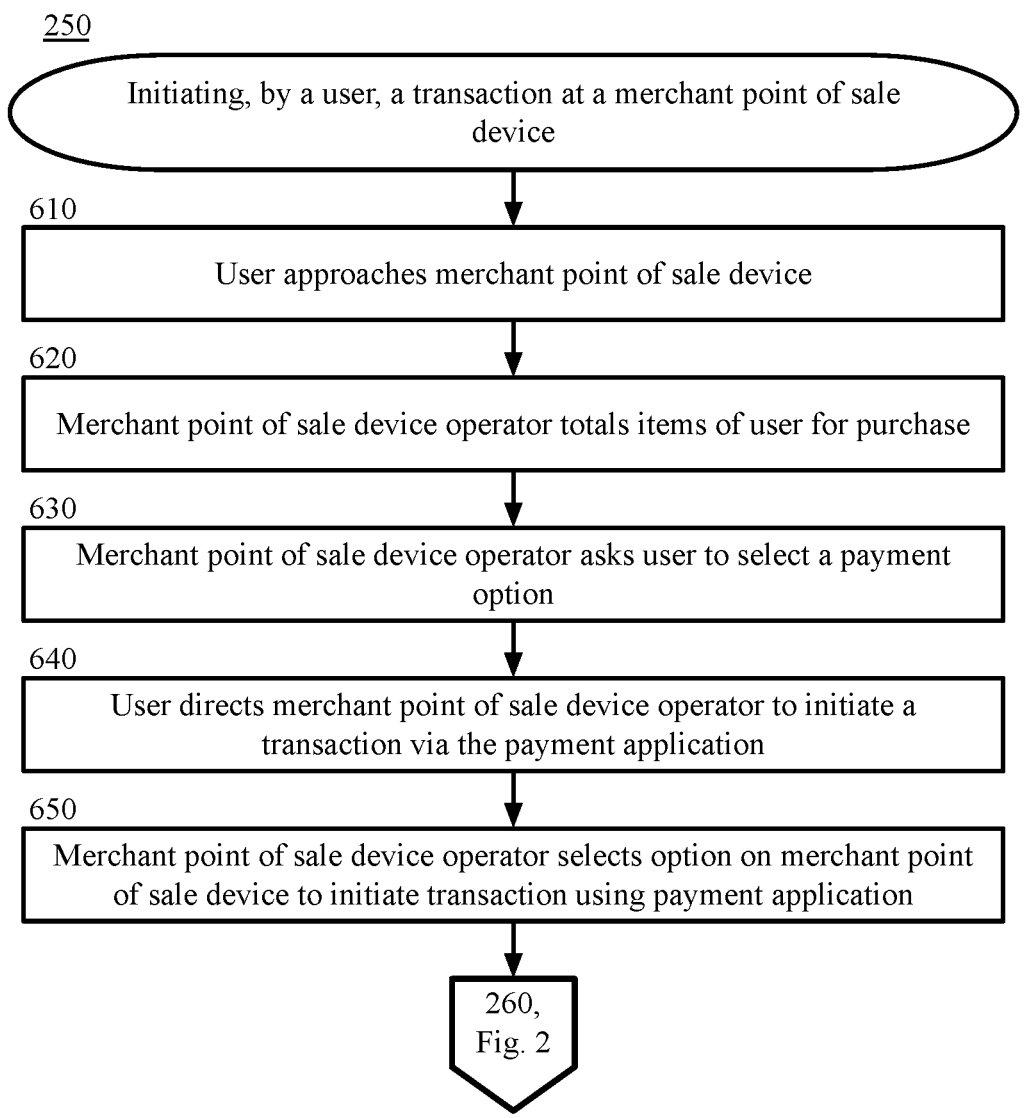
FIG. 6 is a block flow diagram depicting a method to initiate, by a user, a transaction at a merchant point of sale device, in accordance with certain examples.

FIG. 6 is a block diagram depicting a method 250 for initiating, by a user 101, a transaction at a merchant point of sale device 130, in accordance with certain examples. The method 250 is described with reference to the components illustrated in FIG. 1.

In block 610, the user 101 approaches the merchant point of sale device 130. In an example, at a time prior to approaching the merchant POS device 130, the user 101 browses the merchant system location and selects one or more items to purchase. In this example, the user 101 may collect the one or more items and carry, or otherwise transport via physical basket or shopping cart, the one or more items to the merchant POS device 130.

In block 620, the merchant point of sale device 130 operator totals the items of the user 101 for purchase. In an example, the merchant POS device 130 operator 102 scans barcodes attached to the one or more items or otherwise enters descriptions and prices associated with the one or more items into the merchant POS device 130. In an example, after scanning or manually entering the items into the merchant POS device 130, the merchant POS device operator actuates an object on the user interface 135 of the merchant POS device 130 via the payment application 133 to direct the merchant POS device 130 to total the items. In an example, the merchant POS device 130 displays, via the user interface 135, the total to the user 101.

In block 630, the merchant point of sale device 130 operator asks the user 101 to select a payment option. In an example, the merchant POS device 130 displays one or more payment options that the user 101 may select to use in a transaction. Example payment options may comprise payment via a digital wallet application 113 associated with the payment processing system 150, payment by cash, payment by check, payment by credit card, payment by debit card, and/or any other means of payment that the merchant system can or is willing to accept for payment from the user 101. In an example, the one or more payment options are displayed as objects on the user interface 135 and are selectable by the merchant POS device operator in response to the user 101 directing the merchant POS device 102 operator to make a selection.

In block 640, the user 101 directs the merchant point of sale device 130 operator to initiate a transaction via the digital wallet application 113. In an example, in response to receiving a verbal request from the user 101 to select the digital wallet application 113 as a payment option, the merchant POS device 130 operator actuates an object on the user interface 135 of the merchant POS device 130 corresponding to the digital wallet application 113 payment option.

In block 650, the merchant point of sale device 130 operator selects an option on the merchant point of sale device 130 to initiate a transaction using the digital wallet application 113. In an example, the merchant POS device 130 displays a confirmation screen after the merchant POS device 130 operator selects an option to initiate a transaction using the digital wallet application 113. An example confirmation screen may display information summarizing the potential transaction and comprising one or more of a transaction total, a description of the one or more items being purchased by the user 101, and a indication that the user 101 selected the digital wallet application 113 as the method of payment for the transaction. An example confirmation screen may further display options to confirm the transaction or cancel the transaction. In an example, the user 101 reviews the confirmation screen, determines that the information displayed on the confirmation screen is correct, determines to continue with the transaction, and directs the merchant POS device 130 operator to select the option to confirm the transaction via the user interface 135.

In another example, the user 101 decides to abandon the transaction because the information is incorrect or because the user 101 changed his mind and decided not to purchase the items. In yet another example, the confirmation screen further comprises an option to edit the transaction details. In this example, the merchant POS device 130 operator, upon direction of the user 101, may select the option to edit the transaction details and may then edit, add, or delete one or more of the items in the transaction or edit payment details or payment methods for the transaction.

From block 650, the method 250 proceeds to block 260 in FIG. 2.

Returning, to FIG. 2, in block 260, the payment processing system 150 receives a random nonce, and/or a merchant beacon device 120 code, and a request for user account information from the merchant point of sale device 130. The method for receiving, by a payment processing system 150, a random nonce, and/or a merchant beacon device 120 code, and a request for user account information from a merchant point of sale device 130 is described in more detail hereinafter with reference to the method 260 described in FIG. 7. In an example, the payment processing system 150 receives a merchant beacon device 120 code from the merchant point of sale device 130. In another example, the payment processing system 150 receives a random nonce from the merchant point of sale device 130. In yet another example, the payment processing system 150 receives both a merchant beacon device 120 code and a random nonce from the merchant point of sale device 130.

Figure 7:
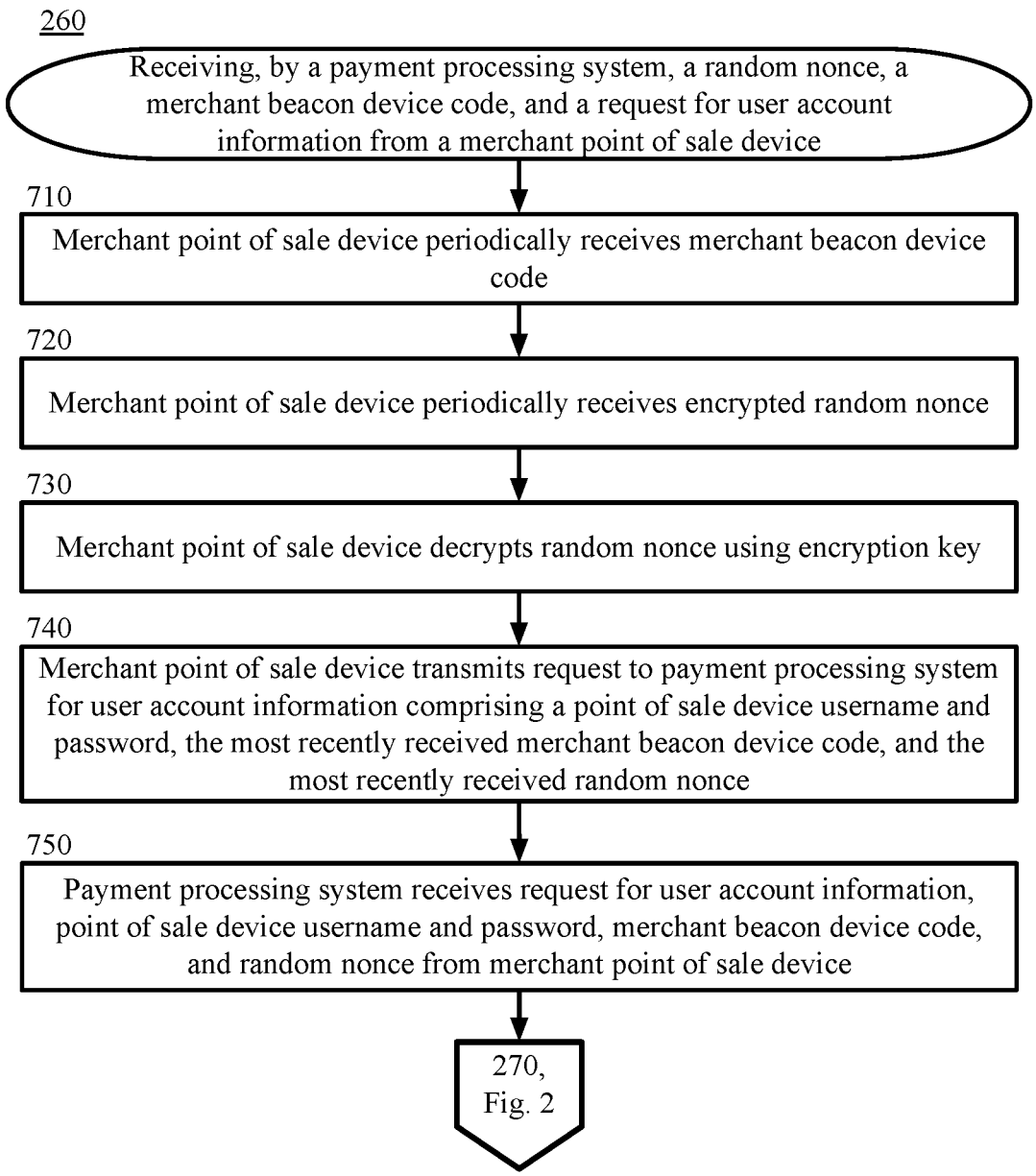
FIG. 7 is a block flow diagram depicting a method for receiving, by a payment processing system, a random nonce, a merchant beacon device code, and a request for user account information from a merchant point of sale device, in accordance with certain examples.

FIG. 7 is a block diagram depicting a method 260 for receiving, by a payment processing system 150, a random nonce, and/or a merchant beacon device 120 code, and a request for user account information from a merchant point of sale device 130, in accordance with certain examples. The method 260 is described with reference to the components illustrated in FIG. 1.

In block 710, the merchant point of sale device 130 periodically receives the merchant beacon device 120 code. In an example, the merchant POS device 130 periodically receives the merchant beacon device 120 code broadcasted by the associated merchant beacon device 120 via the local wireless network 170 at the merchant system location. In an example, the merchant beacon device 120 continuously or periodically broadcasts the merchant beacon device 120 code. For example, the merchant beacon device 120 broadcasts the merchant beacon device 120 code every five seconds. In an example, the user computing device 120 periodically receives the merchant beacon device 120 code according to the frequency that the merchant beacon device 120 transmits the code over the local wireless network 170. In an example, the merchant POS device 130 receives the same merchant beacon device 120 code as received by the user computing device 110 associated with the user 101 initiating the transaction at the merchant POS device 130.

In block 720, the merchant point of sale device 130 periodically receives the encrypted random nonce. In an example, the merchant beacon device 120 broadcasts an encrypted nonce received from the payment processing system 150 via a local wireless network 170 at the merchant system location until receiving a new encrypted random nonce from the payment processing system 150. In this example, in response to receiving the new encrypted random nonce from the payment processing system 150 via the network 160, the merchant beacon device 120 broadcasts the new encrypted random nonce at the merchant system location via the local wireless network 170 until receiving a subsequent new encrypted random nonce from the payment processing system 150. In an example, the merchant point of sale device 130 receives any encrypted random nonces transmitted by the associated merchant beacon device 120 via the local wireless network 170 at the merchant system location. In other examples, random nonces transmitted by the merchant beacon device 120 and received by the associated merchant POS device 130 are not encrypted. In an example, the merchant point of sale device 130 receives the encrypted random nonce via a different wireless network protocol than the wireless network protocol used to transfer the merchant beacon device 120 code from the merchant beacon device 120 to the one or more user computing devices 110 at the merchant system location.

In block 730, the merchant point of sale device 130 decrypts the encrypted random nonce using the encryption key. In an example, the merchant POS device 130 shares a shared encryption key with the payment processing system 150. In another example, the random nonce is not encrypted and the merchant POS device 130 does not need to decrypt the random nonce.

In certain examples, the merchant point of sale device 130 receives and decrypts the random nonce and does not receive a merchant beacon device 120 code. In other examples, the merchant point of sale device 130 receives the merchant beacon device 120 code and does not receive an encrypted nonce. In other examples, the merchant point of sale device 130 receives both an encrypted nonce and a merchant beacon device 120 code.

In example wherein the merchant point of sale device 130 receives either a random nonce or a merchant beacon device 120 code but not both the random nonce and the merchant beacon device 120 code, whether the merchant point-of-sale device 130 receives the beacon device code or the random nonce depends on technical limitations associated with the merchant point of sale device 130. For example, some merchant point-of-sale devices 130 may not be capable of listening to a first local wireless network 170 over which the beacon device code is received by the user computing device 110 from the merchant beacon device 120. In this example, the merchant point of sale device receives the nonce or the encrypted nonce over a second local wireless network 170 that is different from the first local wireless network 170. For example, the first local wireless network 170 comprises a Bluetooth network and the second local wireless network 170 comprises a Wi-Fi network. In other examples, some merchant point-of-sale devices 130 may have the capability to listen to the same local wireless network 170 used by the user computing device 110 to receive the merchant beacon device code. In this example, since the merchant point of sale device 130 is able to receive the merchant beacon device 120 code over the same local wireless network 170 as the user computing device 110, the merchant point of sale device 130 does not need to receive a random nonce. These point-of-sale devices do not need to include nonce In block 740, the merchant point of sale device 130 transmits a request for user 101 account information to the payment processing system 150 comprising a point of sale device 130 username and password, the most recently received merchant beacon device 120 code, and/or the most recently received random nonce. For example, the merchant point of sale device 130 transmits the unencrypted random nonce after decrypting the received encrypted random nonce. In another example, the merchant POS device 130 received a random nonce that was not encrypted and retransmits the random nonce. In an example, when the merchant system registers with the payment processing system 150, the merchant system establishes a separate username and password associated with each merchant POS device 130 at a merchant system location. In an example, the merchant POS device 130 operator configures the username and password associated with the merchant POS device 130 via the payment application 133 of the merchant POS device 130. In this example, the payment processing system 150 maintains a database comprising a merchant POS device 130 identifier for each merchant POS device 130 at a merchant system location. For example, the merchant POS device 130 identifier may comprise a media access control ("MAC") address or an Internet protocol ("IP") address. In another embodiment, multiple merchant point of sale devices 130 at the merchant system location communicate to the payment processing system 150 via a single back-office server that is also present in at the merchant system location. The back-office server is the machine that scans for the random merchant beacon device 120 code and/or the random nonce. In this example, the username and password are associated with this single back-office server and this single back-office server makes requests for user 101 account information to the payment processing system 150 and provides a username and password associated with that server with such requests to the payment processing system 150 for validation. In an example, the back-office server comprises a hardware identifier that is received by the payment processing system 150 whenever the one or more merchant point of sale devices 130 at the merchant system location communicate with the payment processing system 150 over the network 120 via the back-office server. For example, the back-office server hardware identifier comprises a media access control ("MAC") address or IP address.

In an example, in the database, the payment processing system 150 associates the merchant beacon device 120 code, the random nonce, and/or the username and password of the merchant POS device 130 with the merchant POS device 130 identifier or a merchant system location identifier. In an example, when the payment processing system 150 periodically generates a new merchant beacon device 120 code and new (encrypted or unencrypted) random nonce, the payment processing system 150 saves the new random nonce and/or new merchant beacon device 120 code to the database associated with the merchant POS device 130 identifier.

In block 750, the payment processing system 150 receives the request for user 101 account information, the point of sale device 130 username and password, the merchant beacon device 120 code, and the random nonce from the merchant point of sale device 130. In an example, the payment processing system 150 receives, via the network 160, the request for user 101 account information comprising the point of sale device 130 username and password, the user 101 account identifier, the most recently received merchant beacon device 120 code, and/or the most recently received random nonce.

From block 750, the method 260 proceeds to block 270 in FIG. 2.

Returning to FIG. 2, in block 270, the payment processing system 150 validates the merchant point of sale device 130 request for user 101 payment account information. The method for validating, by a payment processing system 150, a merchant point of sale device 130 request for user 101 account information is described in more detail hereinafter with reference to the method 270 described in FIG. 8.

Figure 8:
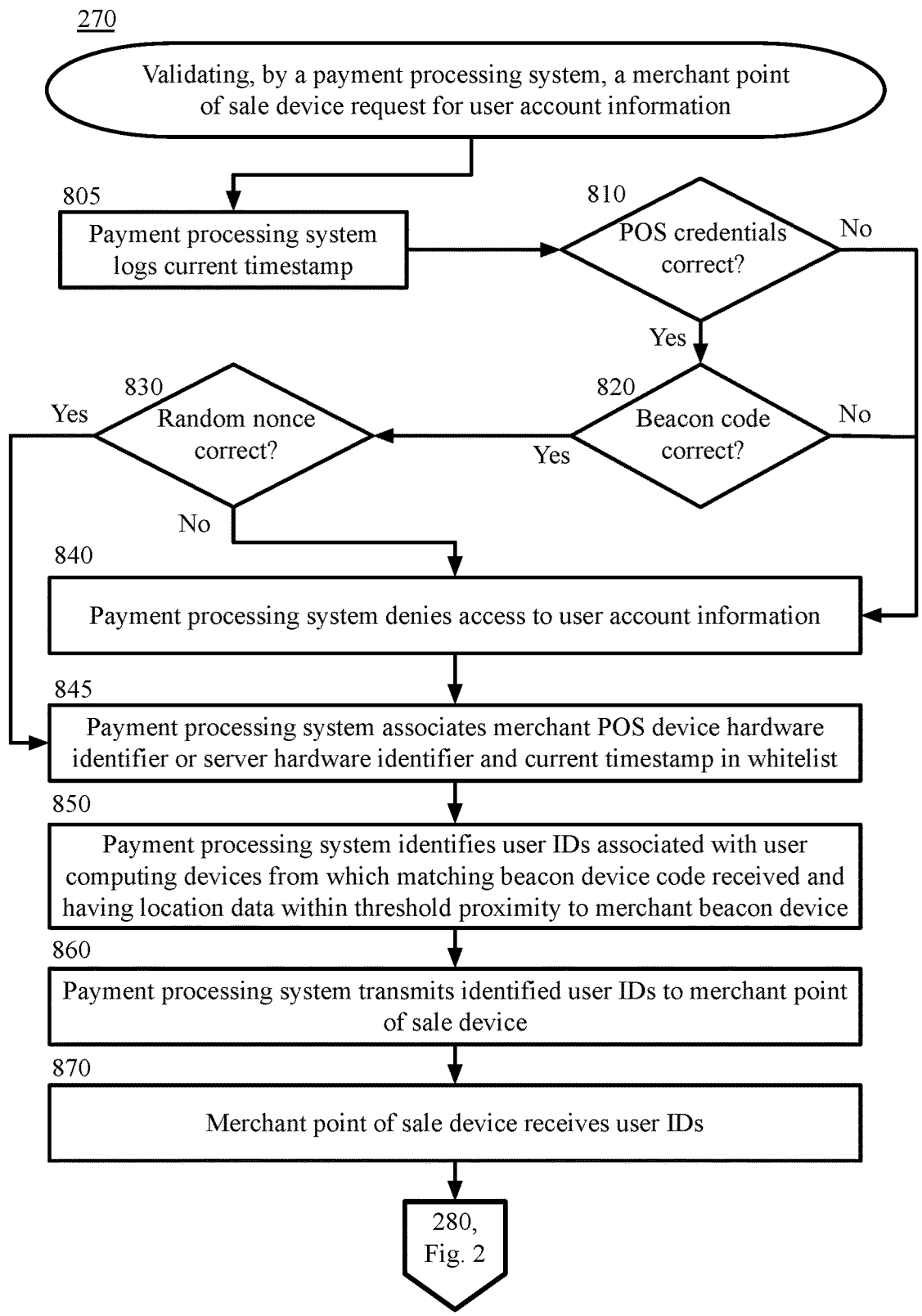
FIG. 8 is a block flow diagram depicting a method for validating, by a payment processing system, a merchant point of sale device request for user account information, in accordance with certain examples.

In an example, the method 270 as described in FIG. 8 is followed for a first request for user account data to a payment processing system 150 from a merchant point of sale device 130 at a merchant location. In this example, subsequent requests for user account data to the payment processing system 150 from the merchant point of sale device 130 are described according to method 270 as described in FIG. 11.

FIG. 8 is a block diagram depicting a method 270 for validating, by a payment processing system 150, a merchant point of sale device 130 request for user 101 account information, in accordance with certain examples. The method 270 is described with reference to the components illustrated in FIG. 1.

In block 805, the payment processing system 150 logs a current timestamp. In an example, the payment processing system 150 logs the current timestamp in response to receiving the request for user account information from the merchant point of sale device 130. An example current timestamp comprises a year, a month, a date, an hour, a minute, a second, a fraction of a second, time zone, and/or any other relevant information associated with the time the current timestamp is logged. For example, the current timestamp comprises "Jan. 15, 2016, 15 hours, 35 minutes, 22 seconds, 29 milliseconds, Eastern Standard Time (EST)."

In block 810, the payment processing system 150 determines whether the merchant POS device 130 username and password are correct or not. In an example, when the merchant POS device 130 is installed at the merchant system location and at a time before the merchant POS device 130 transmits a request to the payment processing system 150 for user account data. For example, the merchant POS device 130 operator initially configures, via the payment application 133 of the merchant POS device 130 and with the payment processing system 150, the username and password associated with the merchant POS device 130. In another example, the merchant POS device 130 operator configures the username and password associated with a common back-office server used by multiple merchant POS devices 130 at the location for communication with the payment processing system 150. In this example, the payment processing system 150 maintains a database that associates a merchant POS device 130 hardware identifier with each merchant POS device 130 at a merchant system location. An example merchant POS device 130 hardware identifier comprises a MAC address or IP address. In this example, in the database, the payment processing system 150 associates the merchant beacon device 120 code, the random nonce, and the username and password of the merchant POS device 130 with the merchant POS device 130 hardware identifier. In another example, in the database, the payment processing system 150 associates the merchant beacon device 120 code, the random nonce, and the username and/or password of the back-office server used by multiple merchant POS devices 130 at the merchant location with a hardware identifier associated with the server. An example back-office server hardware identifier comprises a MAC address or IP address. In an example, the username associated with the merchant POS device 130 and/or the back-office server comprises the respective hardware identifier associated with the respective device. In this example, the merchant POS device 130 or the back-office server may automatically transmit the username associated with the respective device and the merchant POS device 130 operator only inputs the password for transmission to the payment processing system 150.

If the payment processing system 150 determines that the merchant POS device 130 username and/or password or back-office server username and/or password are not correct, the method 280 proceeds to block 940. In this example, the payment processing system 150 receives the merchant POS device 130 identifier along with the request for user 101 account information and retrieves the stored username and stored password associated with the merchant POS device 130 associated with the received merchant POS device 130 identifier. In this example, the payment processing system 150 compares the received username and password from the merchant POS device 130 to the stored username and stored password associated with the merchant POS device 130 in the payment processing system 150 database. In this example, the payment processing system 150 determines that the username and/or the password are not correct if either the username or the password received in the request for user 101 account information does not exactly match the stored username and stored password associated with the merchant POS device 130 identifier.

In block 840, the payment processing system 150 denies access to user 101 account information. In an example, in response to determining that the username and/or the password are not correct if either the username or the password received in the request for user 101 account information does not exactly match the stored username and stored password associated with the merchant POS device 130 identifier, the payment processing system 150 transmits an error message to the requesting merchant POS device 130 via the network 160. In an example, the supposed requesting merchant POS device 130 is, in actuality, an illegitimate device trying to steal user account information and provides an incorrect username and/or password to the payment processing system 150. In an example, the illegitimate device receives the error message from the payment processing system 150 via the network 160.

Returning to block 810, if the payment processing system 150 determines that the merchant POS device 130 username and password or back-office server username and password are correct, the method 280 proceeds to block 920. In this example, the payment processing system 150 receives the merchant POS device 130 identifier along with the request for user 101 account information and retrieves the stored username and stored password associated with the merchant POS device 130 associated with the received merchant POS device 130 identifier. In this example, the payment processing system 150 compares the received username and password from the merchant POS device 130 to the stored username and stored password associated with the merchant POS device 130 in the payment processing system 150 database. In this example, the payment processing system 150 determines that both the received username and the password are correct if this information exactly matches the stored username and stored password associated with the merchant POS device 130 identifier or merchant system location identifier stored in the payment processing system 150 database.

In certain examples described herein, the payment processing system 150 determines whether a received merchant beacon device 120 code is correct and whether a received random nonce is correct. In other examples, the payment processing system 150 validates either a random nonce or a merchant beacon device 120 code and not both the random nonce and the merchant beacon device 120 code.

In block 820, the payment processing system 150 determines whether the received merchant beacon device 120 code is correct or not. In an example, the payment processing system 150 periodically generates a new merchant beacon device 120 code to transmit to the merchant beacon device 120 associated with the merchant POS device 130. For example, the payment processing system 150 generates a new merchant beacon device 120 code for the merchant beacon device 120 every five minutes. In an example, each time the payment processing system 150 generates a new merchant beacon device 120 code to transmit to the merchant beacon device 120, the payment processing system 150 updates the merchant beacon device 120 code associated with the merchant POS device 130 identifier stored in the database. For example, the payment processing system 150 disassociates a first merchant beacon device 120 code that the payment processing system 150 previously assigned to the merchant beacon device 120 in response to the payment processing system 150 generating a second merchant beacon device 120 code and associates the second merchant beacon device 120 code with the merchant POS device 130 identifier in the database. In this example, the payment processing system 150 may disassociate the first merchant beacon device 120 code at an appropriate time interval after generating the second merchant beacon device 120 code to account for delays between generating the second beacon device 120 code and broadcasting the second beacon device 120 code via the merchant beacon device 120. In this example, during this time interval before disassociating the first merchant beacon device 120 code, the payment processing system 150 may recognize both the first merchant beacon device 120 code and the second merchant beacon device 120 code as valid merchant beacon device 120 codes in requests for user 101 account information received from the merchant point of sale device 130.

If the payment processing system 150 determines that the received merchant beacon device 120 code is not correct, the method 270 proceeds to block 840. In this example, the payment processing system 150 receives the merchant beacon device 120 code along with the request for user 101 account information and retrieves the stored merchant beacon device 120 associated with the merchant POS device 130 associated with the received merchant POS device 130 identifier. In this example, the payment processing system 150 compares the merchant beacon device 120 code received from the merchant POS device 130 to the stored merchant beacon device 120 code associated with the merchant POS device 130 in the payment processing system 150 database. In this example, the payment processing system 150 determines that the merchant beacon device 120 code is not correct if the merchant beacon device 120 code received in the request for user 101 account information does not exactly match the stored merchant beacon device 120 code associated with the merchant POS device 130 identifier.

In block 840, the payment processing system 150 denies access to user 101 account information. In an example, in response to determining that the received merchant beacon device 120 code is not correct if the received merchant beacon device 120 code does not exactly match the stored merchant beacon device 120 code associated with the merchant POS device 130 identifier, the payment processing system 150 transmits an error message to the merchant POS device 130 requesting user 101 account information via the network 160. In an example, the requesting merchant POS device 130 is, in actuality, an illegitimate device trying to steal user 101 account information and provides an incorrect merchant beacon device 120 code to the payment processing system 150. In an example, the merchant POS device 130 receives the error message from the payment processing system 150 via the network 160.

Returning to block 820, if the payment processing system 150 determines that the received merchant beacon device 120 code is correct, the method 280 proceeds to block 830. In this example, the payment processing system 150 receives the merchant beacon device 120 code along with the request for user 101 account information and retrieves the stored merchant beacon device 120 code associated with the merchant POS device 130 associated with the received merchant POS device 130 identifier. In this example, the payment processing system 150 compares the received merchant beacon device 120 code to the stored merchant beacon device 120 code associated with the merchant POS device 130 in the payment processing system 150 database. In this example, the payment processing system 150 determines that the received merchant beacon device 120 code is correct if this information exactly matches the stored merchant beacon device 120 code associated with the merchant POS device 130 identifier in the payment processing system 150 database.

In block 830, the payment processing system 150 determines whether the received random nonce is correct or not. In an example, the payment processing system 150 periodically generates a new random nonce to transmit to the merchant beacon device 120 associated with the merchant POS device 130. In this example, the payment processing system 150 may encrypt each generated new random nonce before transmitting the encrypted random nonce to the merchant beacon device 120 via an encryption key shared by the payment processing system 150 and the merchant POS device 130. For example, the payment processing system 150 generates a new random nonce for the merchant beacon device 120 every thirty seconds. In an example, each time the payment processing system 150 generates a new random nonce to transmit to the merchant beacon device 120, the payment processing system 150 updates the random nonce associated with the merchant POS device 130 identifier stored in the database. For example, the payment processing system 150 disassociates a first random nonce that the payment processing system 150 previously assigned to the merchant beacon device 120 in response to the payment processing system 150 generating a second random nonce and associates the second random nonce with the merchant POS device 130 identifier in the database. In this example, the payment processing system 150 may disassociate the first random nonce at an appropriate time interval after generating the second random nonce to account for delays between generating the second random nonce and broadcasting the second random nonce via the merchant beacon device 120. In this example, during this time interval before disassociating the first random nonce, the payment processing system 150 may recognize both the first random nonce and the second random nonce as valid random nonces in requests for user 101 account information received from the merchant point of sale device 130.

If the payment processing system 150 determines that the received random nonce is not correct, the method 280 proceeds to block 840. In this example, the payment processing system 150 receives the random nonce along with the request for user 101 account information and retrieves the stored random nonce associated with the merchant POS device 130 associated with the received merchant POS device 130 identifier. In this example, the payment processing system 150 compares the random nonce received from the merchant POS device 130 to the stored random nonce associated with the merchant POS device 130 in the payment processing system 150 database. In this example, the payment processing system 150 determines that the random nonce is not correct if the random nonce received in the request for user 101 account information does not exactly match the stored random nonce associated with the merchant POS device 130 identifier.

In block 840, the payment processing system 150 denies access to user 101 account information. In an example, in response to determining that the received random nonce is not correct if the received random nonce does not exactly match the stored random nonce associated with the merchant POS device 130 identifier, the payment processing system 150 transmits an error message to the merchant POS device 130 via the network 160. In an example, the requesting merchant POS device 130 is, in actuality, an illegitimate device trying to steal user 101 account information and provides an incorrect random nonce or otherwise does not provide a random nonce to the payment processing system 150. In an example, the merchant POS device 130 receives the error message from the payment processing system 150 via the network 160.

Returning to block 830, if the payment processing system 150 determines that the received random nonce is correct, the method 280 proceeds to block 845. In this example, the payment processing system 150 receives the random nonce along with the request for user 101 account information and retrieves the stored random nonce associated with the merchant POS device 130 associated with the received merchant POS device 130 identifier. In this example, the payment processing system 150 compares the received random nonce to the stored random nonce associated with the merchant POS device 130 in the payment processing system 150 database. In this example, the payment processing system 150 determines that the received random nonce is correct if this information exactly matches the stored random nonce associated with the merchant POS device 130 identifier in the payment processing system 150 database.

In block 845, the payment processing system 150 associates the merchant POS device 130 hardware identifier or server hardware identifier with the current timestamp in a whitelist. For example, the payment processing system 150 logs the current timestamp in response to receiving the request for user account information from the merchant point of sale device 130. An example current timestamp comprises a year, a month, a date, an hour, a minute, a second, a fraction of a second, time zone, and/or any other relevant information associated with the time the current timestamp is logged. For example, the current timestamp comprises "Jan. 15, 2016, 15 hours, 35 minutes, 22 seconds, 29 milliseconds, Eastern Standard Time (EST)." Additionally, the payment processing system 150 receives, along with the request for user account data and over the network 160, a merchant POS device 130 hardware identifier or hardware identifier associated with a back-office server used by the one or more merchant POS devices 130 at the merchant system location to communicate with the payment processing system 150.

In an example, the payment processing system 150 maintains a whitelist comprising a listing of hardware identifiers of merchant POS devices 130 and/or back-office servers involved in requests for user account data where the payment processing system 150 has successfully validated a received random nonce and/or merchant beacon device 120 identifier received in the request. In this example, when a device hardware identifier is added to the whitelist, a current timestamp logged at the time that the request for user account data from the device associated with that particular hardware identifier is logged in the whitelist as being associated with the hardware identifier. In an example, the payment processing system 150 deletes a particular listing in the hardware identifier whitelist when a threshold period of time after the time associated with the current timestamp associated with the listing passes. For example, the payment processing system 150 deletes a listing comprising a hardware identifier and an associated current timestamp an hour after the time associated with the current timestamp. In this example, for a particular listing comprising "Device 184953—Jan. 22, 2016 8:35:00 a.m. Eastern Time," the payment processing system 150 may automatically delete that particular listing for Device 184953 from the hardware identifier whitelist at 9:35 a.m. on the same day, Jan. 22, 2016.

In block 850, the processing system 150 identifies user 101 IDs associated with user computing devices 110 from which matching beacon device 120 codes have been received and having location data within threshold proximity to merchant beacon device 120. In an example, multiple user computing devices 110 retransmit to the payment processing system 150 a merchant beacon device 120 code received from the merchant beacon device 120 via the local wireless network 170 at the merchant system location. In this example, the multiple user computing devices 110 also transmit location data logged by the user computing device 110 at the merchant system location in addition to the merchant beacon device 120 code. For example, the user computing device 110 logs location data if the user 101 is signed in to the digital wallet application 113 and if the user 101 has configured settings of the user 101 account to allow the payment processing system 150 to receive logged location data. In this example, each of the user computing devices 110 transmits a user 101 account identifier associated with a user 101 account associated with the digital wallet application 113 of the respective user computing device 110. In an example, the payment processing system 150 maintains a database comprising a table or other data scheme associating user 101 account identifiers with merchant beacon device 120 codes and location data received from user computing devices 110 at the merchant system location. In an example, when the payment processing system 150 receives an new merchant beacon device 120 code from a user computing device 110 different from a previously received merchant beacon device 120 code, the payment processing system 150 updates the database. In an example, the payment processing system 150 identifies, via the database, user 101 account identifiers associated with a particular received merchant beacon device 120 code.

In block 860, the payment processing system 150 transmits identified user IDs to the merchant point of sale device 130. In an example, the payment processing system 150 transmits the identified user 101 account identifiers to the merchant POS device 130 associated with the merchant beacon device 120 code. For example, the payment processing system 150 database comprises a table or other data scheme that associates merchant POS device 130 identifiers with an associated merchant beacon device 120 code. In this example, for the user 101 account identifiers identified based on a common merchant beacon device 120 code, the payment processing system 150 transmits the user 101 account identifiers to the merchant POS device 130 via the network 160.

In block 870, the merchant point of sale device 130 receives the user IDs. In an example, the merchant POS device 130 receives the identified user 101 account identifiers via the network 160 from the payment processing system 150.

From block 870, the method 270 proceeds to block 280 in FIG. 2.

Returning to FIG. 2, in block 280, the merchant point of sale device 130 operator identifies the user 101 via a challenge and a response. The method for identifying, by a merchant point of sale device 130 operator, a user 101 via a challenge and a response is described in more detail hereinafter with reference to the method 280 described in FIG. 9.

Figure 9:
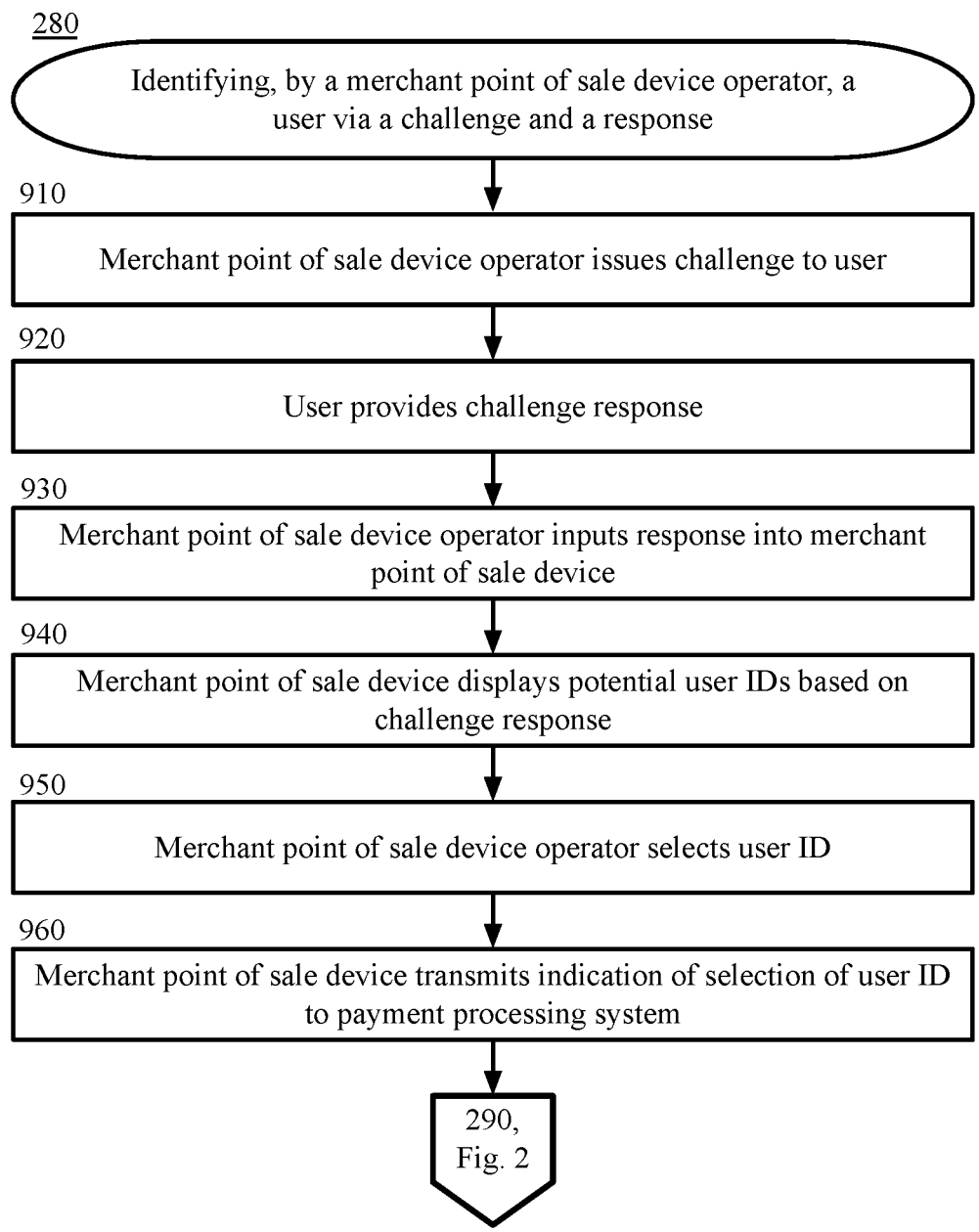
FIG. 9 is a block flow diagram depicting a method for identifying, by a merchant point of sale device operator, a user via a challenge and a response, in accordance with certain examples.

FIG. 9 is a block diagram depicting a method 280 for identifying, by a merchant point of sale 130 device operator, a user 101 via a challenge and a response, in accordance with certain examples. The method 280 is described with reference to the components illustrated in FIG. 1.

In block 910, the point of sale device operator 102 issues a challenge to the user 101. In an example, the merchant POS device 130 operator asks the user 101 for the initials of the user 101. In another example, the merchant POS device 130 operator asks the user 101 for the last four digits of the phone number of the user 101. In another example, the merchant POS device 130 operator asks the user 101 for a configured password. Any suitable challenge may be issued by the merchant POS device 130 operator. In an example, the response to the challenge does not provide any secure or private information.

In block 920, the user 101 provides a challenge response. As described in the example challenges, the responses may be the initials of the user 101, the last four digits of the phone number of the user 101, a configured password, or any other data associated with the user 101. Any configured challenge response may be utilized. In certain embodiments, the response may be a spoken response, a hand gesture, a keypad entry, a display of an identification card, or any suitable response.

In block 930, the point of sale device 130 operator inputs the response into the merchant point of sale device 130. The merchant POS device 130 operator inputs the challenge response of the user 101. In an example, if the user 101 indicates that the initials of the user 101 are "AC," then the merchant POS device operator 102 inputs "AC" into the payment application 133 of the merchant POS device 130. In an example, the user interface 135 of the merchant POS device 130 displays a request for an entry of the response of the user 101. The merchant POS device operator 102 enters the response via a virtual or physical keyboard, voice dictation, or in any suitable manner. In an alternate example, the user 101 enters the response into the user interface 135 of the merchant POS device 130.

In block 940, the merchant point of sale device 130 displays potential users 101 based on the challenge response. The merchant POS device 130 displays potential users 101 based on the challenge response. A list of users 101 that are associated with the challenge response are displayed on the merchant POS device 130 to the merchant POS device 130 operator. For example, if ten customers are in the vicinity of the associated merchant beacon device 120 and the user computing devices 110 associated with each of the ten customers retransmitted the merchant beacon device 120 code to the payment processing system 150, then the merchant POS device 130 may have received from the payment processing system 150 a challenge response associated with each of user 101 accounts of the respective ten customers. When the merchant POS device 130 receives the challenge response input, only the potential users 101 that are associated with the challenge response are displayed to the merchant POS device 130 operator.

In another embodiment, the merchant POS device 130 or the payment processing system 150 which processes the challenge, presents additional challenges until there is a single matching user 101 remaining.

In the example, if the merchant POS device 130 operator inputs "AC" as the initials of the user 101 associated with the transaction, then only the potential users 101 with those initials will be displayed to the merchant POS device 130 operator by the payment application 133. The payment application 133 accesses a database on the payment processing system 150 or another computing device and identifies the initials of the potential users 101. The payment application 133 identifies the one or more potential users 101 that have the initials "AC" and displays the identified user 101 accounts to the merchant POS device 130 operator. In the example, two of the ten customers that are in the vicinity of the merchant beacon device 120 have the initials "AC." The user 101 accounts of the two customers are displayed to the merchant POS device 130 operator.

The payment application 133 may display a picture of the potential user 101 accounts that are presented to the merchant POS device 130 operator. For example, each user 101 may associate a picture with a user 101 account. When the merchant POS device 130 presents the one or more potential user 101 accounts to the merchant POS device operator 102, the merchant POS device operator 102 may select the appropriate user 101 account based on the picture matching the user 101 conducting the transaction. Other identifying information may be presented instead of, or in addition to, a picture. For example, the name of the user 101 may be displayed and the merchant POS device operator 102 may identify the potential user 101 with that name. Any other suitable identifying information may be presented.

In block 950, the merchant point of sale device operator 102 selects the user 101 account for use in a transaction. After identifying the displayed picture of the user 101, the merchant POS device 130 operator may input a selection of the user 101 by actuating a user interface 135 control associated with the picture, or by inputting the selection in any suitable manner. If the picture doesn't match any of the potential users, then the merchant POS device 130 operator may cancel the transaction, notify the user 101 of the discrepancy, or perform any other suitable action.

In an example, only a single user 101 account is presented in the list of potential users 101. If only a single user 101 account is identified, then the method may proceed after the merchant POS device 130 operator verifies that the displayed picture matches the user 101. If the picture doesn't match, then the merchant POS device 130 operator may cancel the transaction, notify the user 101 of the discrepancy, or perform any other suitable action. In certain examples, the merchant POS device 130 operator may take further steps to verify the identity of the user 101 before proceeding with selecting the user 101 identifier for the transaction, for example, by requesting to view an identity document of the user 101.

In block 960, the merchant point of sale device 130 transmits an indication of the selection of the user 101 account identifier to the payment processing system 150. In an example, the merchant point of sale device 130 transmits the indication of the selection of the user 101 account identifier to the payment processing system 150 via the network 160 in response to the merchant POS device 130 operator selecting the user 101 account identifier displayed on the merchant POS device 130. In an example, the payment processing system 150 receives the indication of the selection of the user 101 account identifier via the network 160.

From block 960, the method 280 proceeds to block 290 in FIG. 2.

Returning to FIG. 2, in block 290, a transaction is processed. The method for processing a transaction is described in more detail hereinafter with reference to the method 290 described in FIG. 10.

Figure 10:
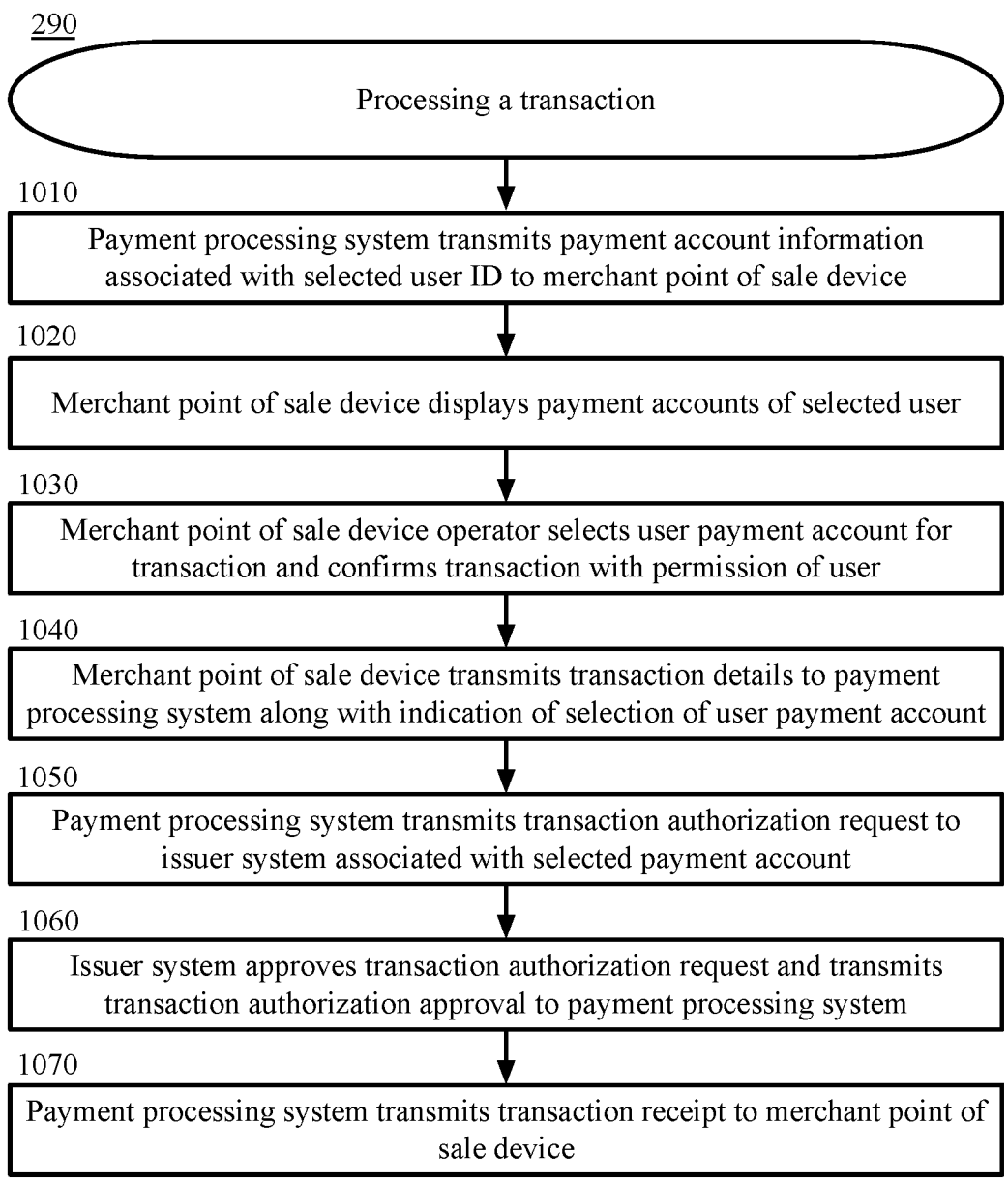
FIG. 10 is a block flow diagram depicting a method for processing a transaction, in accordance with certain examples.

FIG. 10 is a block diagram depicting a method 290 for processing a transaction, in accordance with certain examples. The method 290 is described with reference to the components illustrated in FIG. 1.

In block 1010, the payment processing system 150 transmits account information of the selected user 101 identifier to the merchant point of sale device 130. For example, the user 101 account with the payment processing system 150 comprises payment account information associated with one or more payment accounts of the user 101. An example payment account of the user 101 comprises a credit account, bank account, stored value account, gift card, merchant system charge account, or other relevant user 101 account. In an example, the merchant POS device 130 does not receive complete payment information for one or more of the user 101 payment accounts. For example, the payment information may be obfuscated, occluded, or truncated. For example, the merchant POS device 130 may only receive abbreviated payment information sufficient for a user 101 to identify a payment account via the user interface 135.

In block 1020, the merchant point of sale device 130 displays accounts of the selected user 101. In an example, the merchant POS device 130 does not display complete account information of the user 101 on the user interface 135. For example, for a credit card account, the merchant POS device user interface 135 may display only the name associated with the credit card, last four digits of the credit card number, and the expiration date.

In block 1030, the merchant point of sale device 130 operator selects a user 101 account for transaction and confirms the transaction with permission of the user 101. For example, the user 101 views the account options directly displayed on the user interface 135 or listens to the merchant POS device 130 operator read the user 101 payment account options to the user 101. In an example, the user 101 selects a payment account option to use in the transaction. For example, the user 101 decides to use a credit card account. In an example, the user 101 communicates a selection of a payment account for use in the transaction to the merchant POS device 130 operator. In an example, in response to receiving the user's 101 indication of the payment account, the merchant POS device 130 operator selects the payment account indicated by the user 101 on the merchant POS device user interface 135.

In block 1040, the merchant point of sale device 130 transmits transaction details to the payment processing system 150. For example, the merchant POS device 130 transmits transaction details comprising a transaction total, an account identifier of the merchant system, and the selection of the user 101 account payment option. In an example, the payment processing system 150 receives the transaction details over the network 120. In an example, the payment processing system 150 extracts payment account information from the user 101 account corresponding to the received selection of the user 101 payment account.

In block 1050, the payment processing system 150 transmits a transaction authorization request to an issuer system 140. In an example, the payment processing system 150 generates a transaction authorization request comprising user 101 payment account information, merchant system payment account information, and a total amount of the transaction. In an example, the payment processing system 150 receives the transaction authorization request from the payment processing system 150 via the network 120.

In block 1060, the issuer system 140 approves the transaction authorization request and transmits a transaction authorization approval to the payment processing system 150. In an example, the issuer system 140 subtracts the user's 101 current account balance from the user's 101 credit limit associated with the user's 101 credit account. In an example, if the different between the credit limit and the credit balance is a positive number greater than the total amount of the transaction, the issuer system 140 approves the transaction authorization. For example, the user 101 will not exceed his credit limit if the transaction were to be approved, therefore the issuer system 140 approves the transaction authorization request. In an example, the payment processing system 150 receives the transaction authorization approval from the issuer system 140. In another example, the payment processing system 150 receives a denial of the transaction authorization request in response to the issuer system 140 declining the transaction authorization request. In an example, if the issuer system 140 approves the transaction authorization request, the issuer system 140 credits the merchant system account and adds a charge to the user 101 credit account statement, bank account statement, or other appropriate statement.

In block 1070, the payment processing system 150 transmits a transaction receipt to the merchant point of sale device 130. For example, the payment processing system 150 transmits a confirmation of the approval of the transaction or a notice of a declined transaction to the merchant POS device 130 over the network 120. In an example, the merchant POS device 130 prints a receipt comprising a summary of a successful or unsuccessful transaction via a printer device that is a component of or otherwise communicatively coupled to the merchant POS device 130. In another example, the payment processing system 150 may transmit a transaction receipt to the user computing device 110 to be displayed on the user computing device. In yet another example, the merchant POS device 130 transmits a transaction receipt to the user computing device 110 to be displayed on the user computing device.

FIG. 11 is a block diagram depicting a method 270 for validating, by a payment processing system 150, a merchant point of sale device 130 subsequent request for user 101 account information, in accordance with certain examples. The method 270 is described with reference to the components illustrated in FIG. 1. The method 270 described in FIG. 11 may be used in place of or in addition to the method 270 as described in FIG. 8. In an example, the method 270 described in FIG. 11 follows block 750 in FIG. 7.

In an example, blocks 1105 and 1110 of FIG. 11 follow substantially the same method as blocks 805 and 810 in FIG. 8, respectfully.

In block 1105, the payment processing system 150 logs a current timestamp. In an example, the payment processing system 150 logs the current timestamp in response to receiving the request for user account information from the merchant point of sale device 130. An example current timestamp comprises a year, a month, a date, an hour, a minute, a second, a fraction of a second, time zone, and/or any other relevant information associated with the time the current timestamp is logged. For example, the current timestamp comprises "Jan. 15, 2016, 15 hours, 35 minutes, 22 seconds, 29 milliseconds, Eastern Standard Time (EST)."

In block 1110, the payment processing system 150 determines whether the merchant POS device 130 credentials are correct. For example, the payment processing system 150 determines whether the username and/or password provided by the merchant POS device 130 in the request for user account data are correct. In an example, the payment processing system 150 maintains a database that associates a merchant POS device 130 hardware identifier with each merchant POS device 130 at a merchant system location. In this example, in the database, the payment processing system 150 associates the merchant beacon device 120 code, the random nonce, and the username and password of the merchant POS device 130 with the merchant POS device 130 hardware identifier. In another example, in the database, the payment processing system 150 associates the merchant beacon device 120 code, the random nonce, and the username and/or password of the back-office server used by multiple merchant POS devices 130 at the merchant location with a hardware identifier associated with the server In an example, the username associated with the merchant POS device 130 and/or the back-office server comprises the respective hardware identifier associated with the respective device. In this example, the merchant POS device 130 or the back-office server may automatically transmit the username associated with the respective device and the merchant POS device 130 operator only inputs the password for transmission to the payment processing system 150.

If the payment processing system 150 determines that the merchant POS device 130 username and/or password or back-office server username and/or password are not correct, the method 270 proceeds to block 840. For example, the payment processing system 150 receives the merchant POS device 130 identifier along with the request for user 101 account information and retrieves the stored username and stored password associated with the merchant POS device 130 associated with the received merchant POS device 130 identifier. In this example, the payment processing system 150 compares the received username and password from the merchant POS device 130 to the stored username and stored password associated with the merchant POS device 130 in the payment processing system 150 database. In this example, the payment processing system 150 determines that the username and/or the password are not correct if either the username or the password received in the request for user 101 account information does not exactly match the stored username and stored password associated with the merchant POS device 130 identifier.

In block 840, the payment processing system 150 denies access to user 101 account information. In an example, in response to determining that the username and/or the password are not correct if either the username or the password received in the request for user 101 account information does not exactly match the stored username and stored password associated with the merchant POS device 130 identifier, the payment processing system 150 transmits an error message to the requesting merchant POS device 130 via the network 160. In an example, the supposed requesting merchant POS device 130 is, in actuality, an illegitimate device trying to steal user account information and provides an incorrect username and/or password to the payment processing system 150. In an example, the illegitimate device receives the error message from the payment processing system 150 via the network 160.

Returning to block 1110, if the payment processing system 150 determines that the merchant POS device 130 username and password or back-office server username and password are correct, the method 270 proceeds to block 1120. For example, the payment processing system 150 receives the merchant POS device 130 identifier along with the request for user 101 account information and retrieves the stored username and stored password associated with the merchant POS device 130 associated with the received merchant POS device 130 identifier. In this example, the payment processing system 150 compares the received username and password from the merchant POS device 130 to the stored username and stored password associated with the merchant POS device 130 in the payment processing system 150 database. In this example, the payment processing system 150 determines that both the received username and the password are correct if this information exactly matches the stored username and stored password associated with the merchant POS device 130 identifier or merchant system location identifier stored in the payment processing system 150 database.

In block 1120, the payment processing system 150 determines whether a random nonce and/or beacon device 120 identifier were received in the subsequent request for user account data. In another example, the payment processing system 150 receives the random nonce and/or beacon device 120 identifier and determines whether the payment processing system 150 is able to validate the random nonce and/or the beacon device 120 identifier.

If the payment processing system 150 determines that the random nonce and/or the beacon device 120 identifier were received in the subsequent request for user account data, the method 270 proceeds to block 820 in FIG. 8. For example, the payment processing system 150 determines whether the beacon device 120 code and/or the random nonce are correct and transmits user account information to the merchant POS device 130 or denies access to user account information to the merchant POS device 130 in accordance with the determination of the validity of the beacon device 120 code and/or the random nonce received in the subsequent request for user account data. In this example, the payment processing system 150 determines whether the received merchant beacon device 120 code is correct and whether the received random nonce is correct. In other examples, the payment processing system 150 validates either a random nonce or a merchant beacon device 120 code and not both the random nonce and the merchant beacon device 120 code.

Returning to block 1120, if the payment processing system 150 determines that the random nonce and/or the beacon device 120 identifier were not received in the subsequent request for user account data, the method 270 proceeds to block 1130. In an example, the beacon device 120 at the merchant system location suffers a power outage or is otherwise unable to transmit a merchant beacon device 120 code and/or a random nonce received from the payment processing system 150. In another example, the merchant beacon device 120 broadcasts the merchant beacon device 120 code at the merchant system location but the merchant POS device 130 is unable to receive the merchant beacon device 120 code via the local wireless network. In another example, the merchant point of sale device 130 receives the beacon device 120 code and/or the random nonce and is unable to retransmit the beacon device code and/or the random nonce to the payment processing system 150 along with requests for user account data. In yet another example, the payment processing system 150 receives a random nonce and/or beacon device 120 code but determines that the payment processing system 150 is unable to validate either the beacon device 120 code or the random nonce, if applicable.

In block 1130, the payment processing system 150 determines whether a hardware identifier received from the merchant POS device 130 along with the subsequent request for user account data is listed in a hardware identifier whitelist of the payment processing system 150. In an example, the payment processing system 150 logs a current timestamp in response to receiving any request for user account information from a merchant point of sale device 130. Additionally, the payment processing system 150 receives, along with the request for user account data and over the network 160, a merchant POS device 130 hardware identifier or hardware identifier associated with a back-office server used by the one or more merchant POS devices 130 at the merchant system location to communicate with the payment processing system 150. In an example, the payment processing system 150 maintains a whitelist comprising a listing of hardware identifiers of merchant POS devices 130 and/or back-office servers involved in requests for user account data where the payment processing system 150 has successfully validated a received random nonce and/or merchant beacon device 120 identifier received in the request. In this example, when a device hardware identifier is added to the whitelist, a current timestamp logged at the time that the request for user account data from the device associated with that particular hardware identifier is logged in the whitelist as being associated with the hardware identifier. In an example, the payment processing system 150 deletes a particular listing in the hardware identifier whitelist when a threshold period of time after the time associated with the current timestamp associated with the listing passes. For example, the payment processing system 150 deletes a listing comprising a hardware identifier and an associated current timestamp an hour after the time associated with the current timestamp. In this example, for a particular listing comprising "Device 184953—Jan. 22, 2016 8:35:00 a.m. Eastern Time," the payment processing system 150 may automatically delete that particular listing for Device 184953 from the hardware identifier whitelist at 9:35 a.m. on the same day, Jan. 22, 2016.

If the payment processing system 150 determines that the hardware identifier received from the merchant POS device 130 along with the subsequent request for user account data is not listed in a hardware identifier whitelist of the payment processing system 150, the method 270 proceeds to block 840 in FIG. 8. For example, the payment processing system 150 accesses the hardware identifier whitelist and does not encounter a hardware identifier that matches or substantially matches the hardware identifier received along with the subsequent request for user account data.

In block 840, the payment processing system 150 denies access to user 101 account information. In an example, in response to determining that the hardware identifier received with the subsequent request for user account data does not match or substantially match a hardware identifier listed in the hardware identifier whitelist maintained by the payment processing system 150, the payment processing system 150 transmits an error message to the requesting merchant POS device 130 via the network 160. In an example, the supposed requesting merchant POS device 130 is, in actuality, an illegitimate device trying to steal user account information. In an example, the illegitimate device receives the error message from the payment processing system 150 via the network 160.

Returning to block 1130, if the payment processing system 150 determines that the hardware identifier received from the merchant POS device 130 along with the subsequent request for user account data is listed in the hardware identifier whitelist of the payment processing system 150, the method 270 proceeds to block 850 in FIG. 8. For example, the payment processing system 150 accesses the hardware identifier whitelist and encounters a hardware identifier that matches or substantially matches the hardware identifier received along with the subsequent request for user account data.

After preceding to block 850, in FIG. 8, the method 270 as described in FIG. 11 follows substantially the methods of blocks 850, 860, and 870 as described herein.

Other Examples

Figure 12:
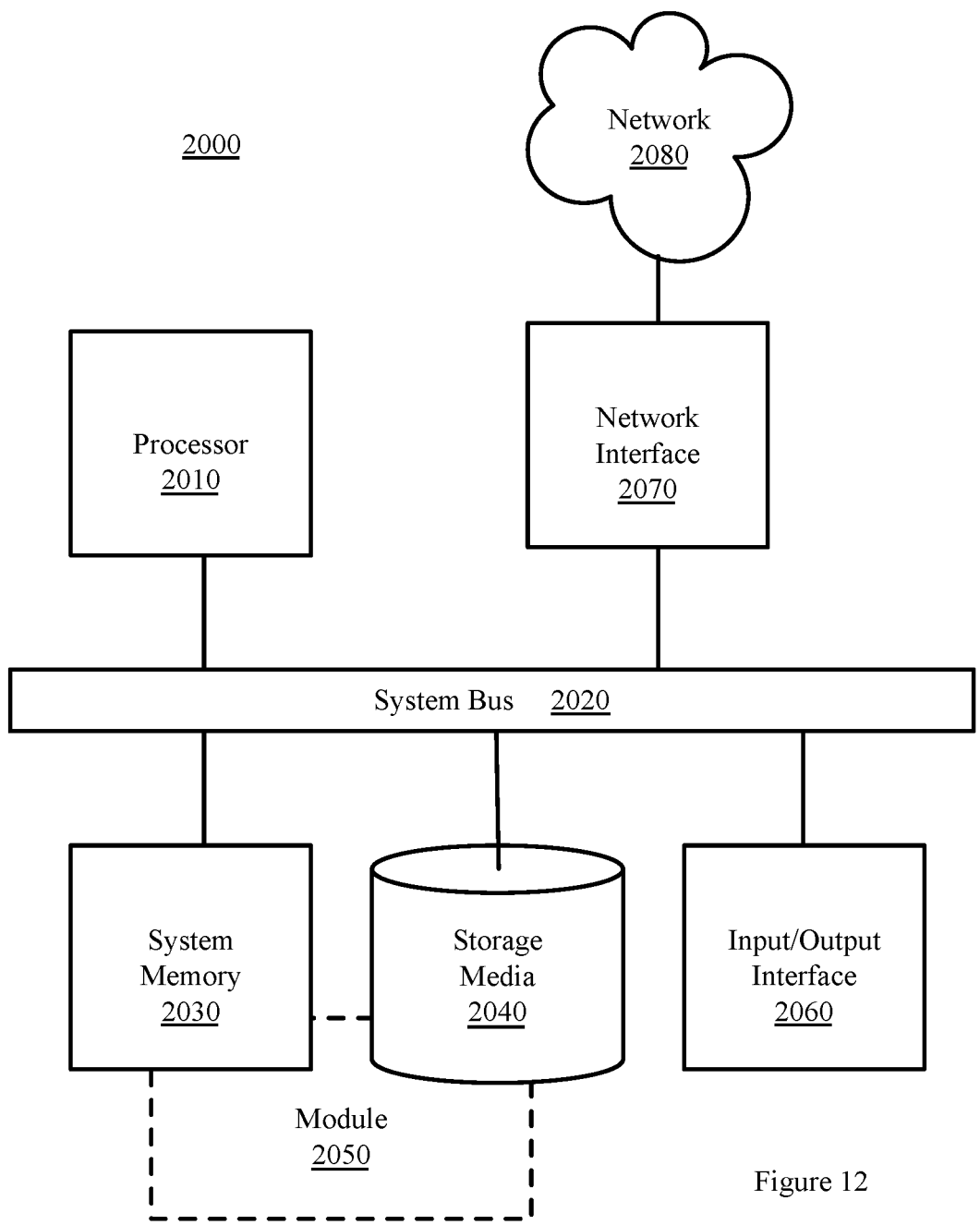
FIG. 12 is a block diagram depicting a computing machine and module, in accordance with certain examples.

FIG. 12 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different examples, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to designate trusted service computing devices, comprising:
    by a payment processing computing system:
        transmitting, to a beacon computing device, an encrypted random nonce, wherein the beacon computing device broadcasts the encrypted random nonce at a location;
        receiving, from a service computing device at the location at a first time, a first request for first user account information associated with one or more user computing devices located at the location at the first time, the first request comprising a service computing device identifier and an unencrypted version of the encrypted random nonce;
        determining that the service computing device is authorized to receive the first user account information based on determining that the received unencrypted version of the encrypted random nonce corresponds to a first random nonce associated with the service computing device;
        in response to determining that the service computing device is authorized to receive the first user account information:
            designating the received service computing device identifier as an approved service computing device identifier; and
            transmitting, to the service computing device, first user account information;
        receiving, from the service computing device at a second time after transmitting the first user account information, a second request for second user account information associated with one or more user computing devices located at the location at the second time, the second request comprising the service computing device identifier; and
        in response to determining that the received service computing device identifier is designated as an approved service computing device identifier, transmitting, to the service computing device, the second user account information.

2. The computer-implemented method of claim 1, further comprising, by the payment processing computing system:
    configuring a user name and a password for the service computing device;
    storing the user name and the password on a memory of the payment processing computing system, wherein the first request for first user account information comprises the user name and the password, and wherein determining that the service computing device is authorized to receive the first user account information is further based on determining that the user name and the password received in the first request for first user account information correspond to the stored user name and the stored password.

3. The computer-implemented method of claim 1, further comprising, by the payment processing computing system:
    generating the first random nonce;
    associating the first random nonce with the service computing device; and
    encrypting the first random nonce using an encryption key to generate the encrypted random nonce.

4. The computer-implemented method of claim 3, further comprising, by the payment processing computing system, transmitting, to the service computing device, the encryption key, wherein the service computing device decrypts the encrypted random nonce via the encryption key to determine the unencrypted version of the encrypted random nonce.

5. The computer-implemented method of claim 1, further comprising, by the payment processing computing system, storing the received service computing device identifier in a list of approved service computing device identifiers, wherein determining that the received service computing device identifier is designated as an approved service computing device identifier comprises determining that the received service computing device identifier is listed in the stored list of approved service computing device identifiers.

6. The computer-implemented method of claim 1, further comprising, by the payment processing computing system, transmitting, to the beacon computing device, a beacon device code, wherein the beacon computing device broadcasts the beacon device code at the location, wherein the first request for first user account information further comprises the beacon device code, and wherein determining that the service computing device is authorized to receive the first user account information further comprises determining that the received beacon device code corresponds to the transmitted beacon device code.

7. The computer-implemented method of claim 1, wherein the service computing device processes a first service request based on a particular account identifier from the transmitted first user account information corresponding to a particular user of a particular user computing device of the one or more user computing devices located at the location at the first time.

8. The computer-implemented method of claim 1, wherein the service computing device comprises a point of sale computing device.

9. A computer program product to designate trusted service computing devices, comprising:
a non-transitory computer-readable medium having computer-executable program instructions embodied thereon that when executed by one or more computing devices cause the one or more computing devices to:
transmit, to a beacon computing device, an encrypted random nonce, wherein the beacon computing device broadcasts the encrypted random nonce at a location;
receive, from a service computing device at the location at a first time, a first request for first user account information associated with one or more user computing devices located at the location at the first time, the first request comprising a service computing device identifier and an unencrypted version of the encrypted random nonce;
determine that the service computing device is authorized to receive the first user account information based on determining that the received unencrypted version of the encrypted random nonce corresponds to a first random nonce associated with the service computing device;
in response to determining that the service computing device is authorized to receive the first user account information:
designate the received service computing device identifier as an approved service computing device identifier; and
transmit, to the service computing device, first user account information;
receive, from the service computing device at a second time after transmitting the first user account information, a second request for second user account information associated with one or more user computing devices located at the location at the second time, the second request comprising the service computing device identifier; and
in response to determining that the received service computing device identifier is designated as an approved service computing device identifier, transmit, to the service computing device, the second user account information.

10. The computer program product of claim 9, the non-transitory computer-readable medium further having computer-executable program instructions embodied thereon that when executed by the one or more computing devices cause the one or more computing devices to:
configure the user name and the password for the service computing device; and
store the user name and the password on a memory of the one or more computing devices, wherein the first request for first user account information comprises the user name and the password, and wherein determining that the service computing device is authorized to receive the first user account information is further based on determining that the user name and the password received in the first request for first user account information correspond to the stored user name and the stored password.

11. The computer program product of claim 9, the non-transitory computer-readable medium further having computer-executable program instructions embodied thereon that when executed by the one or more computing devices cause the one or more computing devices to:
generate the first random nonce;
associate the first random nonce with the service computing device; and
encrypt the first random nonce using an encryption key to generate the encrypted random nonce.

12. The computer program product of claim 11, the non-transitory computer-readable medium further having computer-executable program instructions embodied thereon that when executed by the one or more computing devices cause the one or more computing devices to transmit, to the service computing device, the encryption key, wherein the service computing device decrypts the encrypted random nonce via the encryption key to determine the unencrypted version of the encrypted random nonce.

13. The computer program product of claim 9, the non-transitory computer-readable medium further having computer-executable program instructions embodied thereon that when executed by the one or more computing devices cause the one or more computing devices to store the received service computing device identifier in a list of approved service computing device identifiers, wherein determining that the received service computing device identifier is designated as an approved service computing device identifier comprises determining that the received service computing device identifier is listed in the stored list of approved service computing device identifiers.

14. The computer program product of claim 9, the non-transitory computer-readable medium further having computer-executable program instructions embodied thereon that when executed by the one or more computing devices cause the one or more computing devices to transmit, to the beacon computing device, a beacon device code, wherein the broadcasting beacon computing device broadcasts the beacon device code at the location, wherein the first request for first user account information further comprises the beacon device code, wherein determining that the service computing device is authorized to receive the first user account information further comprises determining that the received beacon device code corresponds to the transmitted beacon device code.

15. The computer program product of claim 9, wherein the service computing device processes a first service request based on a particular account identifier of the transmitted first user account information corresponding to a particular user of a particular user computing device of the one or more user computing devices located at the location at the first time.

16. A system to designate trusted service computing devices, comprising:
a storage device; and a processor communicatively coupled to the storage device, wherein the processor executes application code instructions that are stored in the storage device to cause the system to:
  transmit, to a beacon computing device, an encrypted random nonce, wherein the beacon computing device broadcasts the encrypted random nonce at a location;
  receive, from a service computing device at the location at a first time, a first request for first user account information associated with one or more user computing devices located at the location at the first time, the first request comprising a service computing device identifier and an unencrypted version of the encrypted random nonce;
  determine that the service computing device is authorized to receive the first user account information based on determining that the received unencrypted version of the encrypted random nonce corresponds to a first random nonce associated with the service computing device;
  in response to determining that the service computing device is authorized to receive the first user account information:
    designate the received service computing device identifier as an approved service computing device identifier; and
    transmit, to the service computing device, first user account information;
  receive, from the service computing device at a second time after transmitting the first user account information, a second request for second user account information associated with one or more user computing devices located at the location at the second time, the second request comprising the service computing device identifier; and
  in response to determining that the received service computing device identifier is designated as an approved service computing device identifier, transmit, to the service computing device, the second user account information.

17. The system of claim 16, wherein the processor further executes application code instructions that are stored in the storage device to cause the system to:
  configure a user name and a password for the service computing device; and
  store the user name and the password on the storage device, wherein the first request for first user account information comprises the user name and the password, and wherein determining that the service computing device is authorized to receive the first user account information is further based on determining that the user name and the password received in the first request for first user account information correspond to the stored user name and the stored password.

18. The system of claim 16, wherein the processor further executes application code instructions that are stored in the storage device to cause the system to:
  generate the first random nonce;
  associate the first random nonce with the service computing device; and
  encrypt the first random nonce using an encryption key to generate the encrypted random nonce.

19. The system of claim 18, wherein the processor further executes application code instructions that are stored in the storage device to cause the system to transmit, to the service computing device, the encryption key, wherein the service computing device decrypts the encrypted random nonce via the encryption key to determine the unencrypted version of the encrypted random nonce.

20. The system of claim 16, wherein the processor further executes application code instructions that are stored in the storage device to cause the system to transmit, to the beacon computing device, a beacon device code, wherein the beacon computing device broadcasts the beacon device code at the location, wherein the first request for first user account information further comprises the beacon device code, wherein determining that the service computing device is authorized to receive the first user account further comprises determining that the received beacon device code corresponds to the transmitted beacon device code.

* * * * *